US007199340B2

(12) United States Patent
Yamasaki et al.

(10) Patent No.: US 7,199,340 B2
(45) Date of Patent: Apr. 3, 2007

(54) HIGH FREQUENCY HEATING APPARATUS WITH STEAM GENERATOR

(75) Inventors: Takahiko Yamasaki, Nara (JP); Yasuhisa Mori, Nara (JP); Satomi Uchiyama, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/800,061

(22) Filed: Mar. 12, 2004

(65) Prior Publication Data

US 2004/0232141 A1 Nov. 25, 2004

(30) Foreign Application Priority Data

Mar. 12, 2003 (JP) ........................ P. 2003-066769
Dec. 11, 2003 (JP) ........................ P. 2003-413655

(51) Int. Cl.
*H05B 6/80* (2006.01)
*F24C 7/02* (2006.01)
*A21B 1/22* (2006.01)

(52) U.S. Cl. ...................... 219/682; 219/401; 219/731; 219/756; 219/763; 99/451

(58) Field of Classification Search ........ 219/681–683, 219/702, 730, 731, 756, 759, 762, 400–401; 99/451, 325
See application file for complete search history.

(56) References Cited

U.S. PATENT DOCUMENTS 5,525,782 A * 6/1996 Yoneno et al. .............. 219/682
6,040,564 A * 3/2000 Ueda et al. ................. 219/682
6,133,558 A 10/2000 Ueda et al. ................. 219/682
6,232,587 B1 * 5/2001 Kurita et al. ............... 219/682

FOREIGN PATENT DOCUMENTS

| | | | | |
|---|---|---|---|---|
| CN | 1188534 | | 7/1998 | |
| CN | 1198809 | | 11/1998 | |
| EP | 0 562 741 A1 | | 10/1993 | |
| EP | 0 856 704 A1 | | 8/1998 | |
| EP | 0 952 400 A1 | | 10/1999 | |
| FR | 2 670 272 | * | 6/1992 | ................ 219/731 |
| JP | 54-10460 | * | 1/1979 | ................ 219/682 |
| JP | 54-136453 | * | 10/1979 | ................ 219/682 |
| JP | 60-174453 | * | 9/1985 | ................ 219/682 |
| JP | 8-128650 | | 5/1996 | |
| JP | 08-178298 | | 7/1996 | |
| JP | 10/002562 | | 1/1998 | |
| WO | WO 03/077604 A1 | * | 9/2003 | |

* cited by examiner

*Primary Examiner*—Philip H. Leung
(74) *Attorney, Agent, or Firm*—Pearne & Gordon LLP

(57) ABSTRACT

A high frequency heating apparatus 100 having a high frequency generating portion 13 and a steam generating portion 15 for generating steam into a heating chamber 11 for accommodating a thing to be heated and serving to supply at least one of a high frequency and steam into the heating chamber 11, thereby heating the thing to heated, includes a pan 21 which serves to mount the thing to be heated thereon and is provided to be upward removable apart from a bottom face of the heating chamber 11 at a predetermined interval, thereby dividing a space in the heating chamber 11, steam delivery means 29 for supplying the steam generated by the steam generating portion 15 into an upper space positioned above the pan 21, and preheating means 17 for raising an atmospheric temperature in the heating chamber.

20 Claims, 19 Drawing Sheets

HIGH FREQUENCY HEATING APPARATUS WITH STEAM GENERATOR

BACKGROUND OF THE INVENTION

The present invention relates to a high frequency heating apparatus having a steam generating function and more particularly to a technique for enhancing a cooking functionality and a heating efficiency.

Conventionally, there have variously been proposed a high frequency heating apparatus that supplies steam to a heating chamber accommodating a thing to be heated and heats the thing to be heated (for example, see Japanese Patent Publication JP-A-8-178298). The high frequency heating apparatus of this type can carry out cooking by properly combining high frequency heating, steam heating to be carried out by the supply of steam, and furthermore, heating to be performed by electric heating depending on the type of an apparatus.

In the high frequency heating apparatus, however, it takes a long time to reach a predetermined heating temperature after the supply of steam into a heating chamber at time of the start of heating. For this reason, a time required for cooking is prolonged and the device is not always easy to use. In order to quickly raise a temperature to a predetermined heating temperature, it is effective to increase the amount of generation of the steam. On the other hand, a dew condensation generated on a wall surface in the heating chamber is increased. Consequently, a large amount of water is stored in the bottom face of the heating chamber after the cooking and a great deal of time and labor is required for cleaning. Moreover, the steam supplied at a high temperature is condensed on the wall surface of the heating chamber. Thus, there is also a problem in that the heat quantity of the steam is taken away into the wall surface of the heating chamber so that the amount of heating for the thing to be heated is relatively decreased, resulting in a deterioration in the heating efficiency of the thing to be heated.

In a recent high frequency heating apparatus, furthermore, the volume of the heating chamber is increased so that a large-sized thing to be heated can be cooked. However, it is hard to raise the temperature of the whole heating chamber uniformly and quickly with an increase in the volume of the heating chamber. The shortage of a heating capability can be improved if the number of heating means and an output thereof are increased. However, this countermeasure is not preferable for a high frequency heating apparatus for an ordinary household in consideration of a reduction in a cost and energy saving.

In a conventional high frequency heating apparatus having a steam generating function, moreover, steam is only supplied into a heating chamber to cook a thing to be heated and there is no function of supplying the steam in a desirable timing during baking to regulate a baking condition, for example. Therefore, the cooking device does not make the most of the property of the steam during the cooking but utilizes the same property within a limited range.

SUMMARY OF THE INVENTION

In consideration of the circumstances, it is an object of the invention to provide a high frequency heating apparatus capable of quickly raising the temperature of a thing to be heated up to a predetermined heating temperature and implementing cooking with a high efficiency by effectively utilizing steam.

Moreover, it is another object of the invention to reduce the dew condensation of steam to be supplied to a heating chamber.

The objects can be achieved by the following structures.

More specifically, the invention provides a high frequency heating apparatus having a high frequency generating portion and a steam supply portion for supplying steam into a heating chamber for accommodating a thing to be heated and serving to supply at least one of a high frequency and steam into the heating chamber, thereby heating the thing to heated, comprising a partition plate which serves to mount the thing to be heated thereon and is provided to be upward removable apart from a bottom face of the heating chamber at a predetermined interval, thereby dividing a space in the heating chamber, the steam being supplied into an upper space positioned above the partition plate.

According to the high frequency heating apparatus, the space in the heating chamber is divided into the upper space of the partition plate and the other space by the installation of the partition plate and the steam is supplied to the upper space. Consequently, the space in the heating chamber which is to be used for cooking can be reduced and a responsiveness to a change in the temperature by the heating can be enhanced without increasing a heating capability.

Moreover, the invention provides the high frequency heating apparatus, wherein the steam supply portion includes a steam generating portion in a space formed under the partition plate in the heating chamber, and is constituted to guide steam generated in the steam generating portion to the upper space of the heating chamber through an inner part of the heating chamber.

According to this structure, the steam generating portion is provided in the heating chamber. Simultaneously with the heating in the heating chamber, therefore, the water can be heated to implement the generation of the steam. Thus, a thermal efficiency can be enhanced. Moreover, the steam passes through the inner part of the heating chamber and is guided upward. Consequently, a heat loss can be reduced.

Furthermore, the invention provides the high frequency heating apparatus, wherein a gap is provided between a peripheral edge of the partition plate and a side wall of the heating chamber, and the steam generated in the steam generating portion passes through a side wall of the heating chamber and is guided to the upper space of the heating chamber through the gap.

By this structure, it is possible to efficiently guide the steam to the upper space of the heating chamber with a very simple structure. Moreover, it is also possible to easily form shutter means for controlling the supply. With a structure in which a high frequency supply port is provided on a side wall, a high frequency hits upon the thing to be heated more strongly when it is closer to the high frequency support port. Consequently, there is a problem in that a heating unevenness is generated on a high frequency heating member and is thereby caused over the thing to be heated. By employing the structure in which the steam generated in the steam generating portion passes through the side wall in the heating chamber and is guided to the upper space of the heating chamber through the gap, thus, it is possible to uniformly heat the partition plate provided with the high frequency heating member by the high frequency supplied uniformly from below. Moreover, it is possible to implement uniform wrapping baking by the steam going upward in the gap of the partition plate.

Moreover, the invention provides the high frequency heating apparatus, wherein the partition plate has a through hole on a peripheral part, and the steam generated in the steam generating portion is guided to the upper space of the heating chamber via the through hole.

By this structure, the through hole is only formed on the partition plate. Consequently, it is possible to easily guide the steam to the upper space of the heating chamber. Also in this case, it is possible to easily form the shutter means for controlling the supply.

For example, there are provided a heating chamber for accommodating a thing to be heated, heating means provided in an upper part of the heating chamber and serving to carry out heating by a heater, high frequency generating means provided on a bottom face of the heating chamber and serving to generate a high frequency, thereby carrying out high frequency heating, a device for generating steam, and a pan having a high frequency heating member provided on a back face and serving to mount the thing to be heated thereon. The pan is constituted to form a gap together with the heating chamber. Consequently, it is possible to obtain a structure in which the steam generated from the steam generating device provided on the bottom face of the heating chamber goes upward and passes through the gap between the pan and the heating chamber, and is stored in an upper part in which the thing to be heated is provided.

The partition plate is constituted to divide the heating chamber into two portions. Consequently, a large amount of steam is supplied to the thing to be heated and is prevented from being scattered, and at the same time, the spread of a high frequency supplied from a lower part toward the upper part of the pan is lessened and the amount of the high frequency to be supplied to the high frequency heating member is increased so that the lower surface of the thing to be heated is browned more easily. Thus, it is also possible to obtain an advantage that the heating can be carried out with a high efficiency also when the heating is performed by the heater.

The invention provides the high frequency heating apparatus, wherein the partition plate includes a high frequency heating member.

According to the high frequency heating apparatus, the high frequency heating member generates heat at a high frequency. In a preheating stage, consequently, an atmospheric temperature in the heating chamber can be raised. In a main heating stage, moreover, the thing to be heated which is mounted on the partition plate can be heated from a lower side.

The invention provides the high frequency heating apparatus, wherein the partition plate includes a high frequency shielding member.

According to this structure, the partition plate is constituted to include a high frequency shielding material such as a metal which is pervious to a high frequency wave with difficulty. Consequently, the upward spread of the high frequency supplied from below is more lessened so that a water decrease rate to the thing to be heated can be reduced at a most effciency. By this structure, moreover, the high frequency can be prevented from directly hitting upon the thing to be heated and local overheating can be prevented. Consequently, it is possible to obtain such an advantage that the water of the thing to be heated can be held by heating using steam and the heated thing can taste good with moisture.

The invention provides the high frequency heating apparatus, wherein the partition plate includes a ceramic material or a heat resistant resin material.

According to the high frequency heating apparatus, the ceramic material or the heat resistant resin material acts as the high frequency heating member. Consequently, heat generated by the high frequency heating member is stored in the high frequency heating member so that the thing to be heated can be heated uniformly. After the high frequency heating is stopped, moreover, the thing to be heated can be continuously heated by the heat generated from the high frequency heating member and the latent heat of the steam. It is also effective to employ a structure in which a high frequency heating member film is formed on a substrate.

The invention provides the high frequency heating apparatus, wherein the partition plate includes a metal plate.

According to the high frequency heating apparatus, the partition plate is constituted by the metal plate or the metal plate is used as the substrate. When the thing to be heated is heated by the high frequency heating member, therefore, the heating of the thing to be heated at the high frequency can be suppressed positively.

The invention provides the high frequency heating apparatus, further comprising preheating means for raising an atmospheric temperature in the heating chamber.

According to this structure, the atmospheric temperature in the heating chamber is raised by the preheating means and the steam is then supplied to the heating chamber. Consequently, the dew condensation on the wall surface of the heating chamber can be suppressed and the thing to be heated can be heated efficiently. Moreover, it is possible to efficiently implement the steam cooking without increasing the amount of the steam.

The invention provides the high frequency heating apparatus, wherein the preheating means includes an upper heater provided in an upper part of the heating chamber.

According to the high frequency heating apparatus, a heater to be used for preheating can also be utilized for cooking. Thus, the upper heater can be utilized effectively.

The invention provides the high frequency heating apparatus, wherein the preheating means includes a high frequency heating member provided on the partition plate.

According to the high frequency heating apparatus, the high frequency heating member provided on the partition plate generates heat at a high frequency. In the preheating stage, consequently, the atmospheric temperature in the heating chamber can be raised efficiently.

The invention provides the high frequency heating apparatus, wherein steam delivery means has a steam delivery path for guiding generated steam from an inner part of the heating chamber to an outside of the heating chamber, thereby introducing the steam into the heating chamber again.

According to the high frequency heating apparatus, the steam delivery path is provided on the outside of the heating chamber. Consequently, it is possible to eliminate a scale or a contamination from the thing to be heated which sticks onto the steam delivery path. Thus, the high frequency heating apparatus can be maintained cleanly.

The invention provides the high frequency heating apparatus, wherein the partition plate is engaged with an engaging portion provided in a plurality of height positions on an internal wall surface of the heating chamber.

According to the high frequency heating apparatus, the height of the partition plate in the heating chamber can be set optionally depending on the contents of cooking. Consequently, it is possible to easily vary the heating force of the steam without controlling a temperature.

The invention provides the high frequency heating apparatus, wherein the steam generating portion is provided along a wall surface on a back side of a bottom face of the heating chamber.

In particular, the steam generating portion is provided on the bottom face of the heating chamber. Consequently, it is possible to effectively utilize the whole heating chamber without sacrificing the space for cooking. Moreover, it is also selectable to once guide the steam generated on the lower side to the outside of the heating chamber and to introduce the same steam from the upper part of the heating chamber again or to cause the steam to go upward along the wall surface in the heating chamber. Furthermore, water is supplied to the bottom face of the heating chamber. Therefore, the water can be stably stored, and furthermore, the water can be prevented from being carelessly spilt during a work for taking out food so that an operability can also be enhanced. Moreover, the water is supplied to the bottom face of the heating chamber. Therefore, other electrical components or electronic components provided in the upper stage of the bottom face of the heating chamber can be prevented from being splashed with the water. Furthermore, there can be produced an advantage that it is possible to make the most of the feature of the steam to go upward, thereby carrying out cooking utilizing the steam even if a thing to be heated is provided on the bottom face of the heating chamber. By this structure, moreover, it is possible to carry out the uniform heating of the partition plate provided with the high frequency heating member and uniform wrapping cooking by the steam going upward in the gap between the heating chamber and the partition plate and the heating operation of the heater with a high frequency wave (a microwave) supplied uniformly from below.

The high frequency heating apparatus according to the invention has such a structure that the steam supplied by the steam supply portion directly hits upon the thing to be heated.

By this structure, the steam having a high temperature hits upon the thing to be heated so that the same thing can be heated uniformly and efficiently by latent heat. It is possible to efficiently raise the temperature of the thing to be heated by causing the steam having a high temperature to directly hit upon the thing to be heated.

The high frequency heating apparatus according to the invention comprises high frequency distributing means for distributing and supplying a high frequency into the heating chamber.

By this structure, there is provided the high frequency distributing means for distributing and supplying the high frequency into the heating chamber. Consequently, local overheating can be prevented and the heating can be carried out more uniformly from below. Thus, the partition plate can be heated uniformly, a temperature unevenness over the partition plate can be suppressed and a heating unevenness can be more reduced.

The high frequency heating apparatus according to the invention comprises a control portion for controlling the high frequency generating portion, the steam generating portion and the preheating means, the control portion being constituted to execute, in this order, a preheating step of heating the heating chamber by heat generation of the preheating means and a main heating step of supplying at least one of a high frequency generated from the high frequency generating portion and steam supplied from the steam generating portion to carry out a heating process over the thing to be heated.

According to the high frequency heating apparatus, the preheating step is executed and the main heating step of supplying steam is then executed. Consequently, the steam is supplied when the heating chamber is brought into a high temperature atmosphere. Thus, the dew condensation of the supplied steam over the wall surface of the heating chamber can be reduced considerably. Thus, it is possible to obtain a structure which does not require a great deal of time and labor for cleaning but is easy to use.

The high frequency heating apparatus according to the invention comprises a control portion for controlling the high frequency generating portion, the steam generating portion and the preheating means, the control portion having an interrupt processing function for supplying steam from the steam generating portion into the heating chamber for a predetermined time while the thing to be heated is heated.

According to the high frequency heating apparatus, the steam is supplied while the thing to be heated is heated. Consequently, the inner part of the thing to be heated can be uniformly heated by the latent heat of the steam, and furthermore, the heated thing can be browned uniformly. In the case in which the heating chamber is heated up to a steam temperature or more, furthermore, the atmospheric temperature in the heating chamber can be dropped to cool the thing to be heated.

The high frequency heating apparatus according to the invention comprises a steam supply switch for executing the interrupt processing in an optional timing.

According to the high frequency heating apparatus, the steam can be supplied into the heating chamber in an optional timing during the cooking, and a necessary amount of steam for the cooking can be supplied in a necessary timing by a simple operation. Accordingly, a heating unevenness can be prevented so that a uniform wrapping process can be carried out.

According to the high frequency heating apparatus of the invention, the space in the heating chamber is divided into the upper space of the partition plate and the other space by the partition plate so that the space in the heating chamber to be used for the cooking can be reduced. By supplying the steam to the reduced space, it is possible to enhance a responsiveness to a change in a temperature by the heating without improving a heating capability. By raising the atmospheric temperature in the heating chamber by the preheating means to supply the steam to the heating chamber, moreover, it is possible to suppress a dew condensation over the wall surface of the heating chamber and to heat the thing to be heated uniformly and efficiently.

DETAILED DESCRIPTION OF THE PREFERRED EMBODIMENTS

Preferred embodiments of a high frequency heating device according to the invention will be described below in detail with reference to the drawings.

(First Embodiment)

Figure 1:
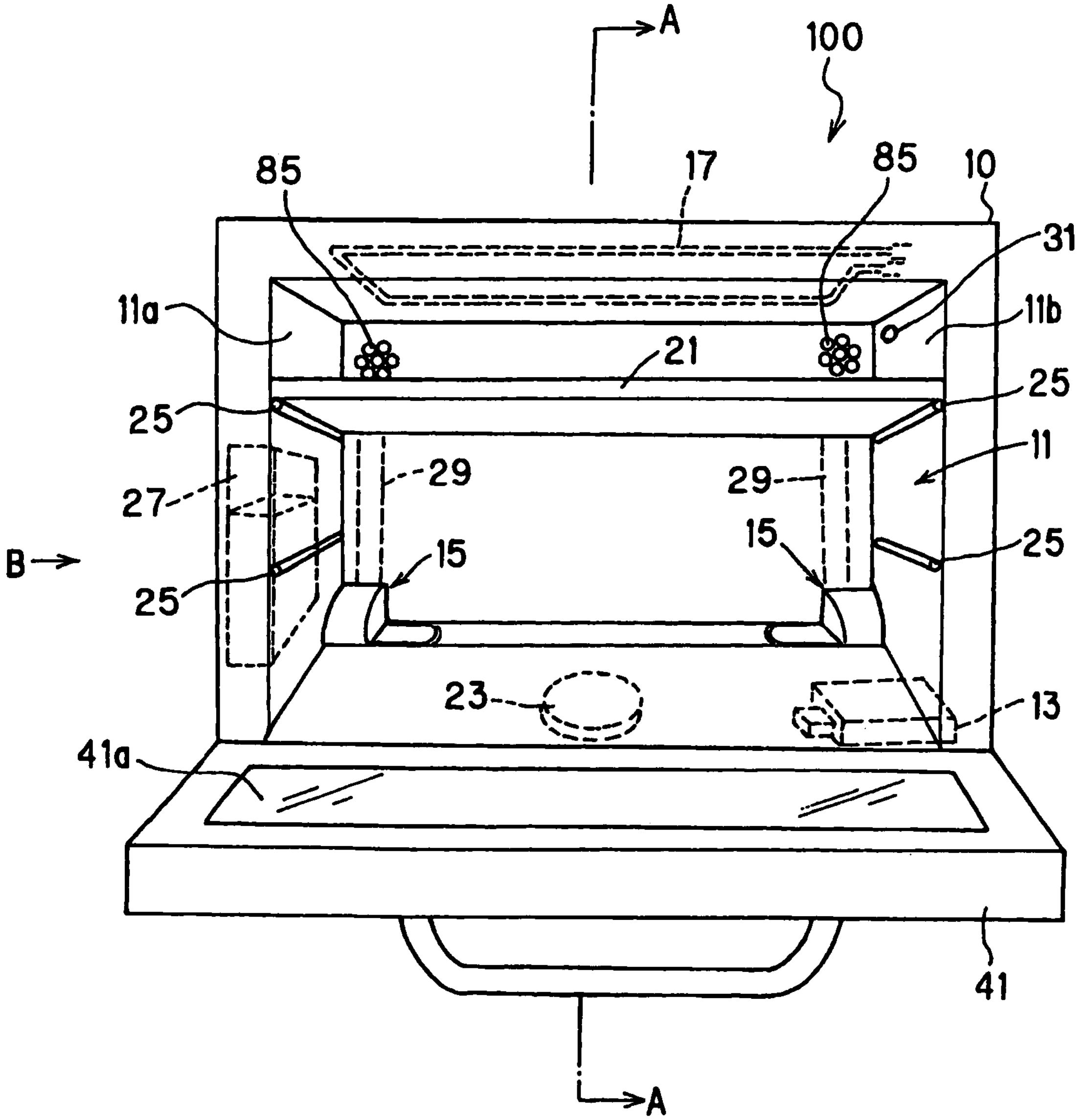
FIG. 1 is a front view showing a state in which the openable door of a high frequency heating apparatus according to a first embodiment of the invention is opened.
Figure 2:
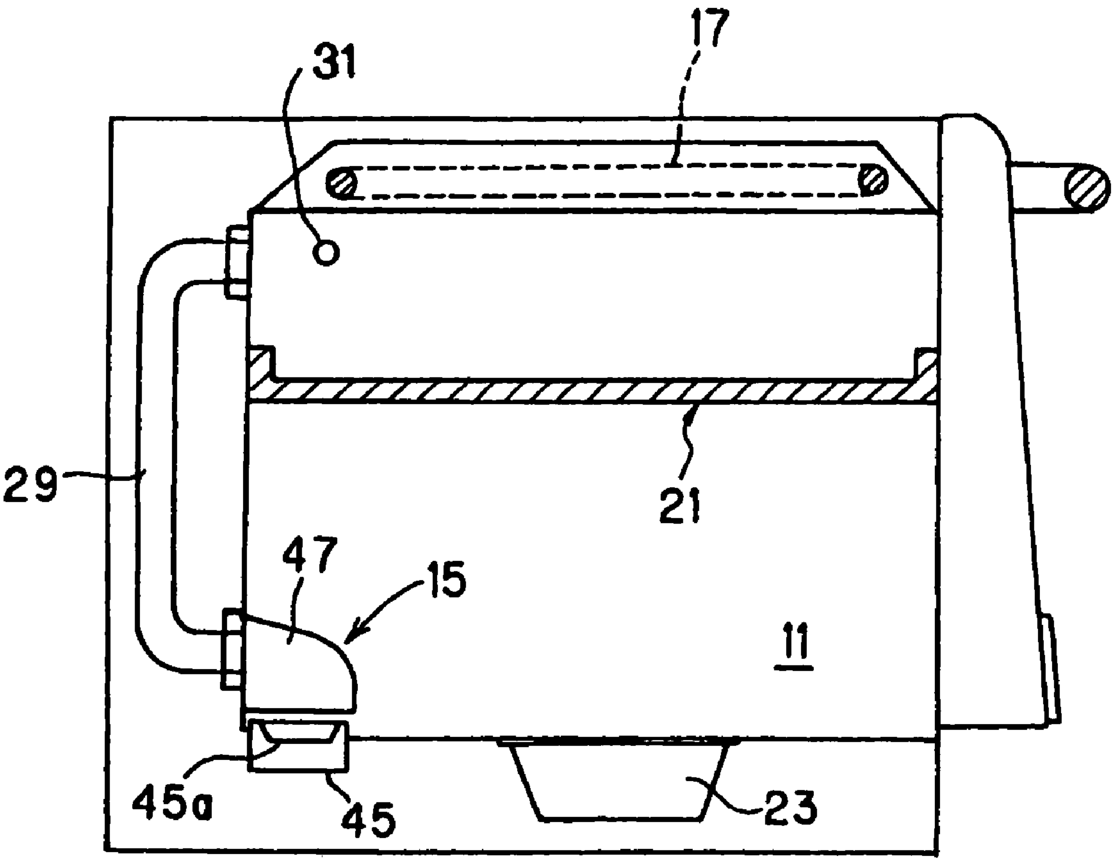
FIG. 2 is a conceptual view showing an A—A section in FIG. 1.
Figure 3:
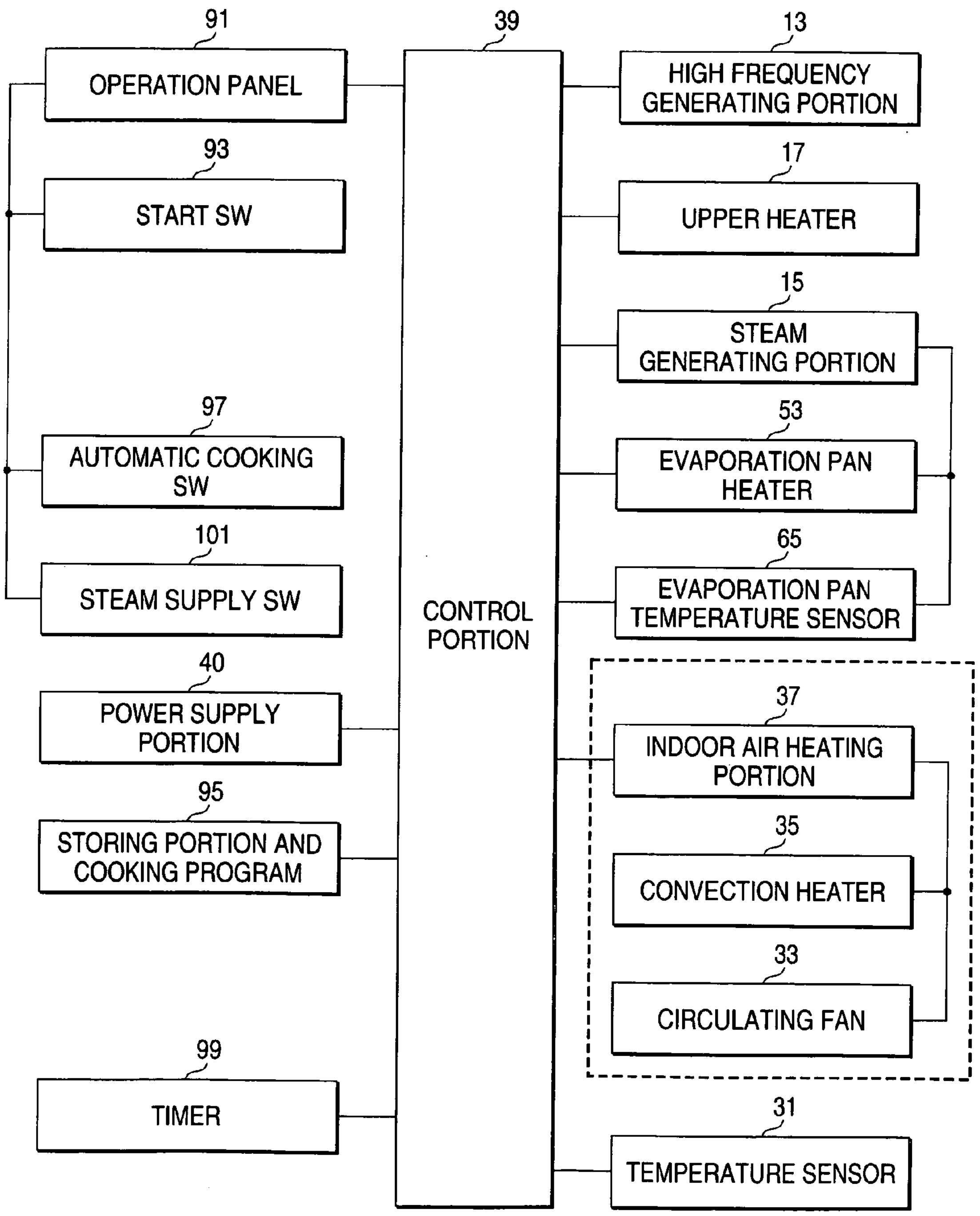
FIG. 3 is a block diagram showing the control of the high frequency heating apparatus.

FIG. 1 is a front view showing a state in which the openable door of a high frequency heating apparatus according to a first embodiment of the invention is opened, FIG. 2 is a conceptual view showing a section taken along A—A in FIG. 1, and FIG. 3 is a block diagram showing the control of the high frequency heating apparatus.

A high frequency heating apparatus 100 serves to supply at least one of a high frequency wave (a microwave) and steam to a heating chamber 11 for accommodating a thing to be heated, thereby heating the thing to be heated, and is characterized in that a space in the heating chamber 11 is divided into two portions having an upper space and a lower space by a pan 21 to be a partition plate as shown in FIG. 1. Furthermore, the cooking device 100 has a high frequency generating portion 13 formed by a magnetron for generating a high frequency, a steam generating portion 15 for generating steam in the heating chamber 11, an upper heater 17 to be preheating means which is provided in the upper part of the heating chamber 11, and the pan 21 provided in an upper part from the bottom face of the heating chamber 11 at a predetermined interval and serving to mount the thing to be heated thereon.

The high frequency generated from the high frequency generating portion 13 is distributed to the whole heating chamber 11 by means of a stirrer blade 23 for stirring a high frequency which is to be rotated. Moreover, the pan 21 is supported on engaging portions 25 formed on side wall surfaces 11*a* and 11*b* of the heating chamber 11 and also acts as the partition plate. The engaging portions 25 are provided to support the pan 21 in a plurality of height positions of the heating chamber 11. When the pan 21 is engaged with the engaging portions 25, the space of the heating chamber 11 is vertically divided into two portions. Water is supplied to the steam generating portion 15 from a feed water tank 27 provided on the side part of the heating chamber 11.

The steam generating portion 15 is provided in at least one of corner portions at the inner side of the bottom face of the heating chamber 11. While two steam generating portions 15 are provided on both corners at the inner side as an example in the embodiment, one steam generating portion 15 may be provided on either side. As shown in FIG. 2, moreover, a steam pipe 29 to be steam delivery means for supplying the steam generated from the steam generating portion 15 into the upper space of the heating chamber through the pan 21 is provided as a steam delivery path by causing the steam generating portion 15 to communicate with the upper part of the heating chamber 11, that is, the upper space obtained by dividing the space of the heating chamber 11 into two portions through the pan 21. A temperature sensor 31 such as a thermistor or an infrared ray sensor is attached to a side surface on the inner side of the heating chamber 11, thereby measuring the temperature of the heating chamber 11.

As shown in FIG. 3, an indoor air heating portion 37 including a circulating fan 33 for stirring and circulating air in the heating chamber 11 and a convection heater 35 for heating the air circulating in the heating chamber 11 may be attached to the high frequency heating apparatus 100 according to the invention. The operation of each of these portions is carried out in response to a control command sent from a control portion 39 including a microprocessor.

Moreover, an operation panel 91 provided on an openable door 41 includes various operation switches such as a start switch 93 for giving an instruction for starting a heating operation and an automatic cooking switch 97 for selecting a cooking program which is prepared.

The control portion 39 is supplied with a power from a power supply portion 40 connected to a commercial power supply and controls a power distribution to each portion in such a manner that the heating power of each of the high frequency generating portion 13, the upper heater 17 and the steam generating portion 15 does not exceed an allowable power value.

The heating chamber 11 is formed in a box-shaped body case 10 having an open front surface, and the openable door 41 having a translucent window 41*a* for opening a port for taking out the heated thing from the heating chamber 11 is openably attached to the front surface of the body case 10.

The high frequency generating portion 13 is provided in the lower space of the heating chamber 11 and includes, as high frequency distributing means, the stirrer blade (23) or a rotating antenna in a position on the almost center of the bottom face of the heating chamber 11 in which a high frequency generated from the magnetron is received, for example. The high frequency generating portion 13 and the stirrer blade 23 can also be provided on other surface sides of the heating chamber 11 in addition to the bottom portion of the heating chamber 11. The high frequency distributing means may be rotated or may use a combination of a high frequency reflecting unit.

As shown in FIG. 2, the steam generating portion 15 includes a heating block 45 having a water storing concave portion 45*a* for generating steam by heating, and a steam duct 47 for covering the water storing concave portion 45*a* of the heating block 45 to introduce the generated steam into the steam pipe 29.

The basic principle of the generation of the steam in the high frequency heating apparatus 100 will be described briefly.

Figure 4:
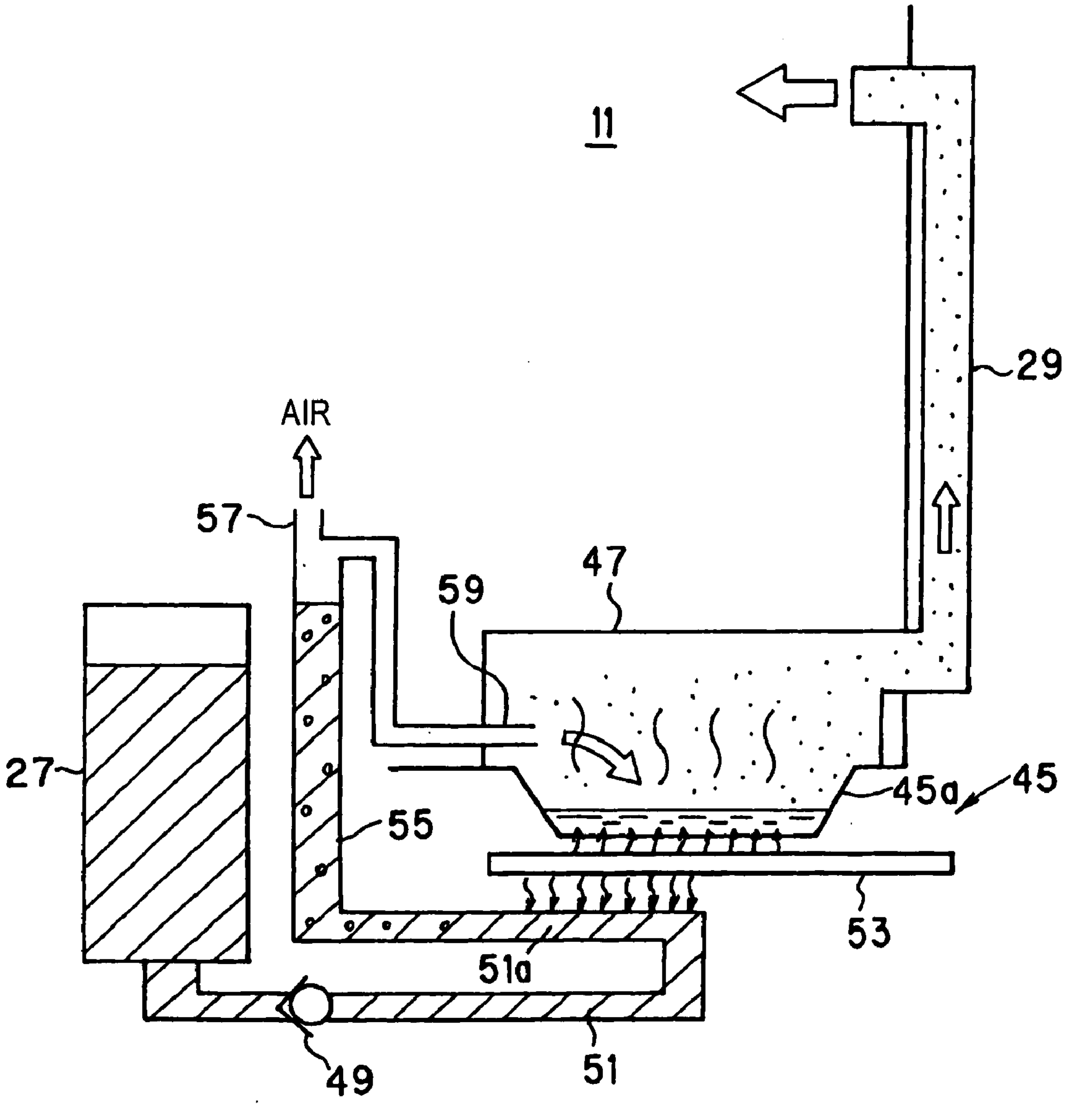
FIG. 4 is an explanatory view representing the basic principle of the generation of steam of the high frequency heating apparatus, FIGS. 5(*a*) and 5(*b*) are views showing the appearance of a heating block, FIG. 5(*a*) being a perspective view showing an upper surface side and FIG. 5(*b*) being a perspective view showing a back face side, FIGS. 6(*a*) and 6(*b*) are schematic views showing a steam generating portion in a heating chamber, FIG. 6(*a*) being a schematic exploded view and FIG. 6(*b*) being a schematic assembly view.

FIG. 4 is an explanatory view representing the basic principle of the generation of the steam in the high frequency heating apparatus.

The water stored in the feed water tank 27 is supplied to a feed water pipe 51 through a check valve 49. Heat generated from a sheath heater 53 of the heating block 45 is transferred to an intermediate portion piping 51*a* of the feed water pipe 51 so that the water in the intermediate portion piping 51*a* is heated. A part of the water thus heated boils in a change into hot water, thereby generating bubbles so that a volume expansion is suddenly caused. At this time, the check valve 49 on the feed water tank 27 side of the feed water pipe 51 is closed so that a reverse flow toward the feed water tank 27 side is impeded. Accordingly, the water having the volume expansion is intermittently supplied to a discharge side piping 55. Consequently, a water level is raised in the discharge side piping 55 and excessive steam is discharged from an air vent hole formed on an upper part, and furthermore, the heated water is intermittently supplied from a discharge port 59 to the water storing concave portion 45*a* of the heating block 45.

On the other hand, the water storing concave portion 45*a* is also heated by the sheath heater 53, and the heated water which is dropped evaporates herein and the steam duct 47 is filled therewith. The filling steam is supplied from the upper part of the heating chamber 11 through the steam pipe 29. In other words, the heated water is supplied to the water storing concave portion 45*a* by the heat generation of the sheath heater 53 of the heating block 45, and furthermore, the water storing concave portion 45*a* is heated.

A specific example of a structure for implementing the generation of the steam will be described below in detail.

Figure 5:
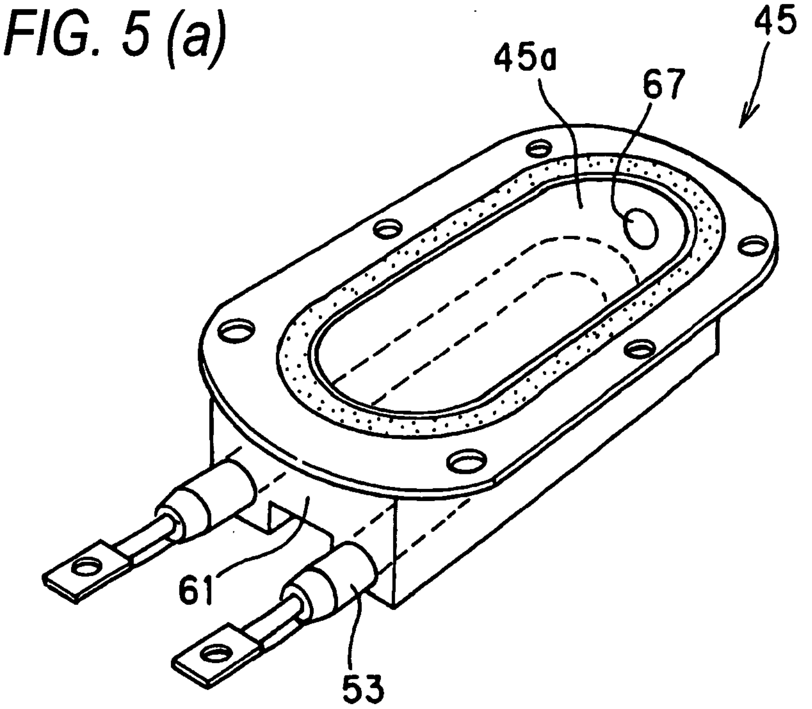
Figure 5:
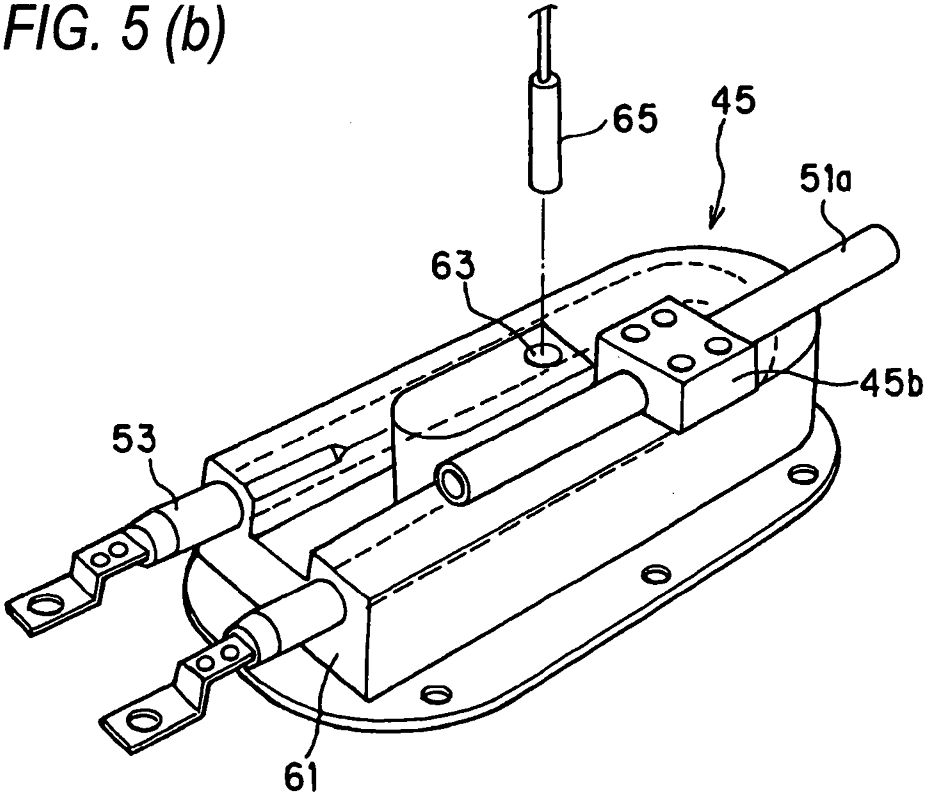

FIG. 5 is a perspective view showing the appearance of the heating block. (a) shows an upper surface side and (b) shows a back face side.

The heating block 45 is an aluminum die-casting molded product having a light weight and a high thermal conductivity. The inner U-shaped sheath heater (evaporation pan heater) 53 of a body 61 is buried in the heating block 45, and the water storing concave portion 45*a* is formed on an upper surface side along the sheath heater 53 and a heating portion 45*b* for covering the intermediate portion piping 51*a* of the feed water pipe 51 is formed on a lower surface side. The water storing concave portion 45*a* and the heating portion 45*b* are formed integrally by die-casting and a connected surface is not present. Therefore, the heat generation of the sheath heater 53 can be transferred efficiently.

Moreover, a thermistor (evaporation pan temperature sensor) 65 for detecting a temperature is inserted in a housing hole 63 positioned under the water storing concave portion 45*a*, thereby measuring a temperature in the vicinity of the sheath heater 53 of the body 61. An opening hole 67 is formed on one end side of the water storing concave portion 45*a* and the water is supplied from the discharge port 59 into the water storing concave portion 45*a*. The shapes and attachment positions of the sheath heater 53 and the heating portion 45*b* can be properly changed depending on a necessary heating amount or an installation space for the high frequency heating apparatus 100 in a housing. It is also possible to use other kinds of heaters such as a wire heater and a ceramic heater in place of the sheath heater 53.

Figure 6:
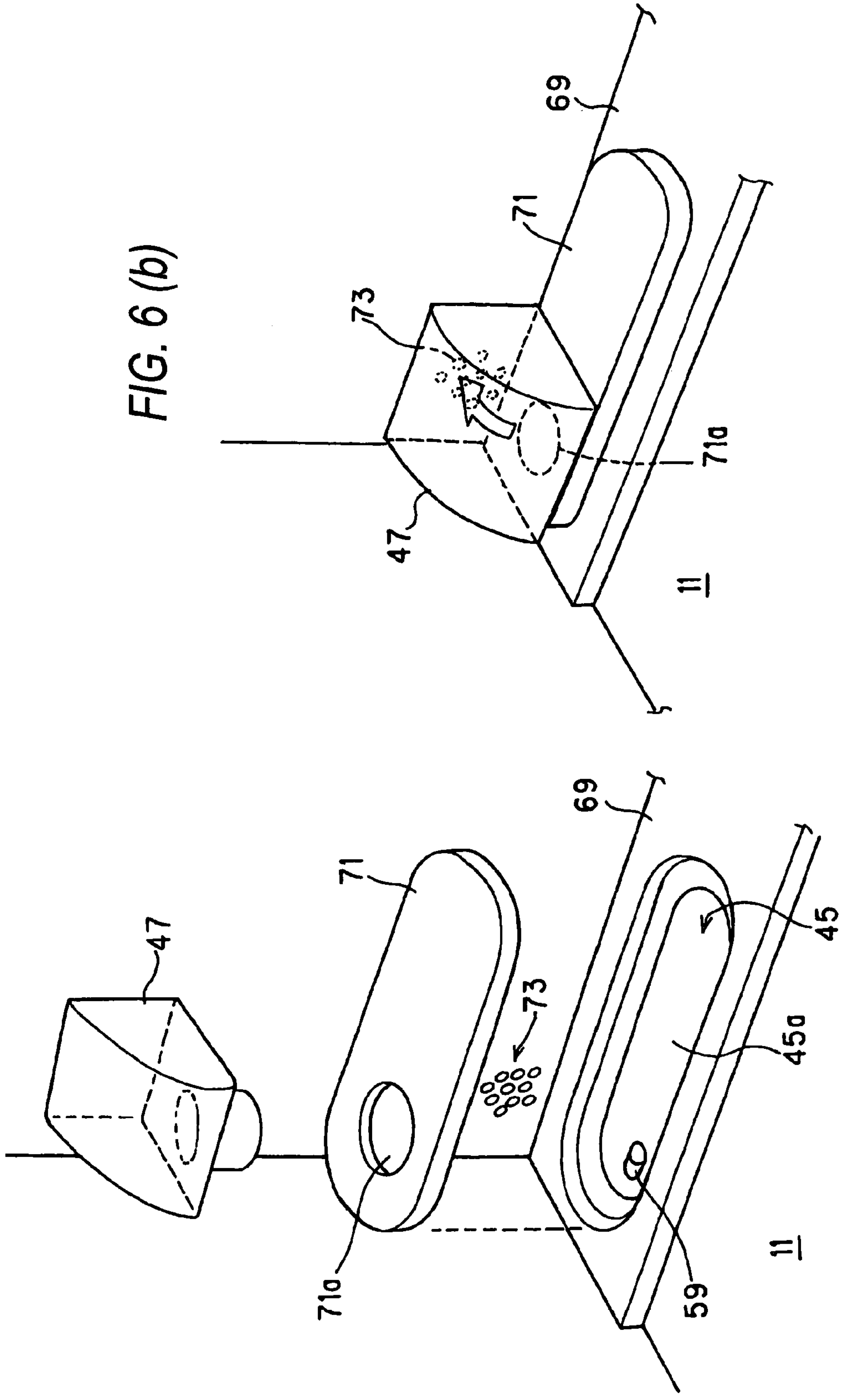

FIG. 6 schematically shows the steam generating portion 15 in the heating chamber, (a) being an exploded view and (b) being an assembly view.

The heating block 45 is provided with the water storing concave portion 45*a* turned upward on the lower side of a stepped portion 69 protruded from the bottom face of the heating chamber 11, and furthermore, a cover member 71 for covering the water storing concave portion 45*a* and the steam duct 47 having a hollow structure which is connected to an opening hole 71*a* of the cover member 71 and is opened toward a steam take-out port 73 formed on the inner surface of the heating chamber 11 are removably attached to the upper part of the water storing concave portion 45*a*. The steam introduced into the steam take-out port 73 is supplied to the upper space of the heating chamber 11 through the steam pipe 29 as shown in FIG. 2. If the steam duct 47 is removed, the steam can be supplied from the bottom face side of the heating chamber 11.

The surface of the water storing concave portion 45*a* of the heating block 45 is processed with a hydrophilic material containing silicate acid ($SiO_2$) so that the water can be prevented from being spherical and a large contact area can be maintained, and a larger amount of steam can easily be generated. On the other hand, the surfaces of the cover member 71 and the steam duct 47 are processed with a hydrophobic material such as fluorine so that a contamination such as an evaporation residue can be prevented from sticking during evaporation, and furthermore, the sticking contamination can easily be removed if any. For example, in a process for generating the steam, calcium, magnesium or a chlorine compound in the water is concentrated to precipitate and stick to the bottom portion of the water storing concave portion 45*a* in some cases. By wiping the water storing concave portion 45*a* with a cloth, however, it is possible to completely remove the contamination. Moreover, the steam duct 47 is removable. Therefore, a cleaning work can easily be carried out.

Figure 7:
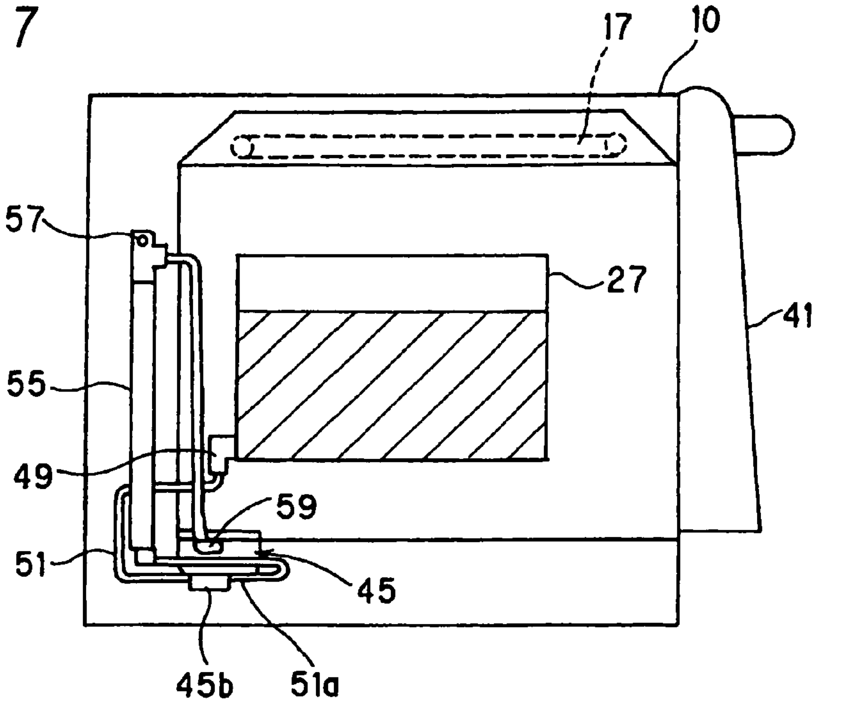
FIG. 7 is a view seen in a direction of B in FIG. 1.

In order to explain a water feeding path from the feed water tank 27 shown in FIG. 1 to the heating block 45, FIG. 7 is a view seen in a direction of B in FIG. 1. In the same manner as in FIG. 4 illustrating the principle of the generation of the steam, the water in the feed water tank 27 is supplied to the feed water pipe 51 through the check valve 49, and is heated by the heating portion 45*b* of the heating block 45 and is supplied to the discharge side piping 55. The water thus heated is intermittently supplied from the discharge port 59 to the water storing concave portion 45*a* of the heating block 45. For the feed water pipe 51, particularly, a material having a high thermal conductivity such as a copper pipe is suitably used around the heating portion 45 for receiving a heat transfer.

Figure 8:
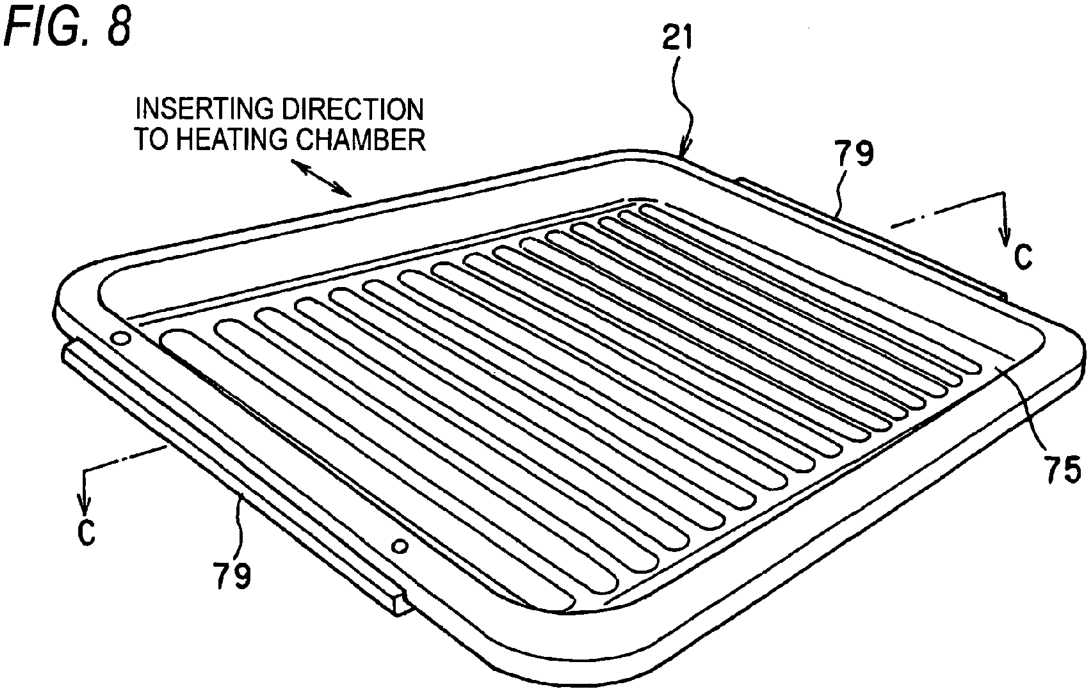
FIG. 8 is a perspective view showing the appearance of a pan, FIGS. 9(*a*) and 9(*b*) are sectional views taken along C—C in FIG. 8, FIG. 9(*a*) being a view showing an example in which a convex portion is formed and FIG. 9(*b*) being a view showing an example in which a metal plate is wavy.
Figure 9:
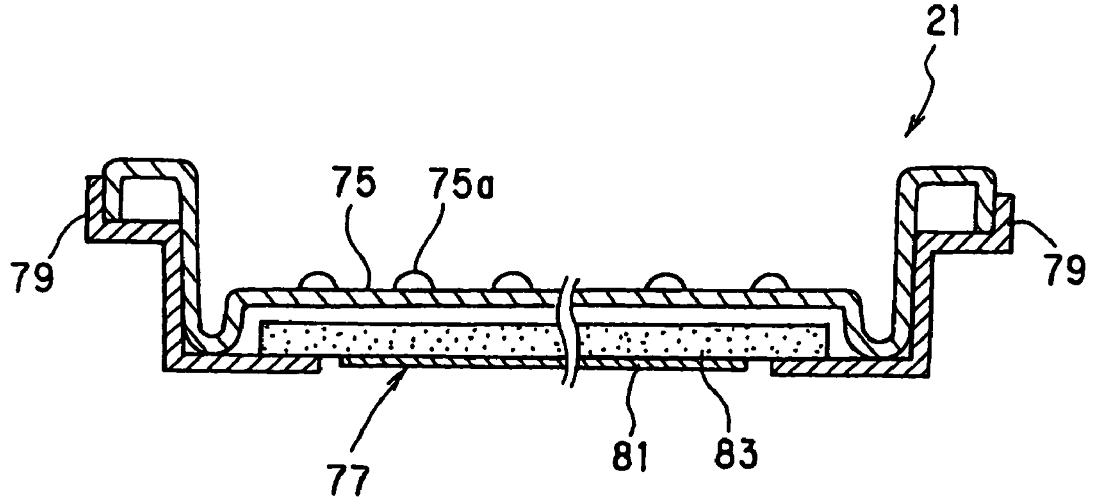
Figure 9:
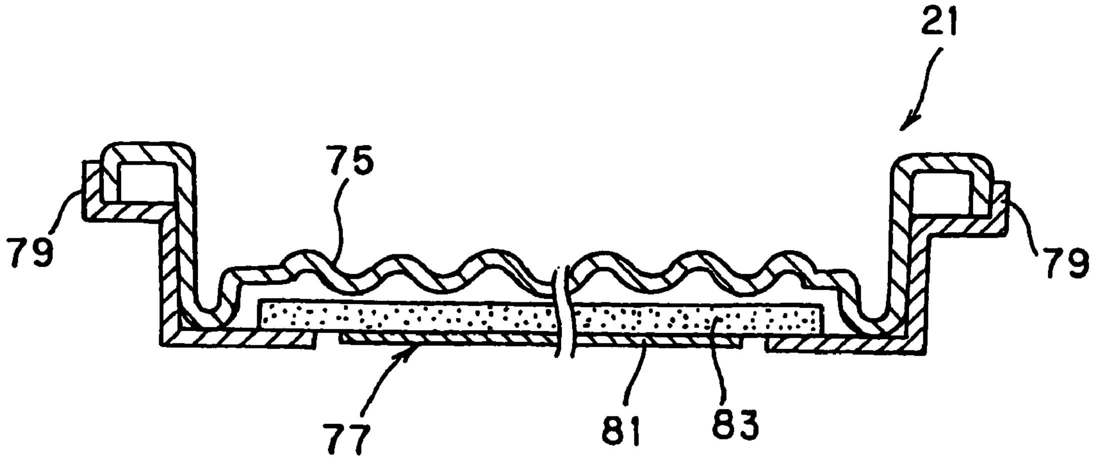

Next, the pan 21 shown in FIG. 1 will be described. FIG. 8 is a perspective view showing the appearance of the pan 21 and FIG. 9 is a sectional view taken along C—C in FIG. 8.

The pan 21 can easily be removed and attached in a plurality of height positions with respect to the heating chamber 11, and has a metal plate 75 to be a surface for mounting a thing to be heated thereon, a high frequency heating member 77 provided opposite to or in contact with the metal plate 75, and a fixing member 79 serving to fix the high frequency heating member 77 to the metal plate 75 and to be engaged with the engaging portion 25 (see FIG. 1) on the heating chamber 11 side.

The metal plate 75 is formed by an aluminized steel plate and has such a depth as to store the water with wavy concavo-convex portions provided on a surface thereof. The aluminized steel plate has a surface side which is subjected to fluorine coating with a high antifouling effect and a back side which is subjected to black heat-resistant coating with a high heat absorbing effect.

In the high frequency heating member 77, a high frequency absorbing film 81 formed by a dielectric material such as nitride and boride which absorbs a high frequency and generates heat is provided in close contact with a substrate 83 on an opposite surface to the metal plate 75 side. The substrate 83 is formed by a ceramic material or a heat-resistant resin material, and a material having a high heat storing effect is suitably used.

The fixing member 79 is formed by an insulator provided on both sides in the heating chamber inserting direction of the pan 21, and forms a gap together with the heating chamber 11, thereby preventing the generation of a spark during high frequency heating. If the gap is increased to guide the steam in the lower space of the heating chamber 11 to the upper space, the steam can be guided to the upper space through the internal wall of the heating chamber 11 more efficiently.

As shown in FIGS. 9(*a*) and 9(*b*), moreover, the metal plate 75 is provided with a convex portion 75*a* or the metal plate 75 itself is provided with the concavo-convex portions to take a wavy shape so that a distance between the high frequency absorbing film 81 and the metal plate 75 is increased. Consequently, an electric field strength is increased over the high frequency absorbing film 81. Thus, it is possible to obtain such an advantage that the amount of heat generation over the high frequency absorbing film 81 is increased. In addition to the structure in which the high frequency absorbing film 81 is provided on the back face, the high frequency heating member 77 may be formed by a dielectric such as ceramic in such a manner that a high frequency absorbing unit itself generates heat at a high frequency. Moreover, the high frequency heating member 77 may be constituted by a ceramic rubber obtained by mixing ceramic powder into a rubber, for example, a ferrite rubber.

While the metallic aluminized steel plate is used as the metal plate 75, a plate for reflecting a high frequency on a surface may be used. In place of the metal plate 75, a high frequency reflecting layer may be provided on a ceramic base material through metal plating or metal deposition. Furthermore, it is also possible to use stainless, aluminum and an aluminum alloy, various plated steel plates such as a galvanized sheet iron, an aluminum zinc alloy plated sheet iron and a copper plated sheet iron, a cold rolled steel, and a clad metal. Although the nitride or the boride is used for the high frequency absorbing film 81, moreover, it is also possible to use other dielectric materials, for example, metal oxides such as tin oxides or indium oxides and composite oxides. The pan 21 is not restricted to the structure described above but may be basically a flat plate capable of receiving the water due to the dew condensation of a thing M to be heated.

Next, description will be given to the function of the high frequency heating apparatus 100 according to the invention.

For example, first of all, the pan 21 is attached into the heating chamber 11 and the thing M to be heated is mounted on the pan 21 in order to carry out grill cooking while performing steam heating. Then, the openable door 41 of the high frequency heating apparatus 100 is closed and various switches provided on the operation panel 91 (see FIG. 3) are operated to set a desirable heating mode and to then press down the start switch 93. In the case in which the heating is to be carried out in an automatic cooking mode, moreover, a cooking program prepared in a storing portion 95 is selected by pressing down the automatic cooking switch 97 and the start switch 93 is then pressed down.

Figure 10:
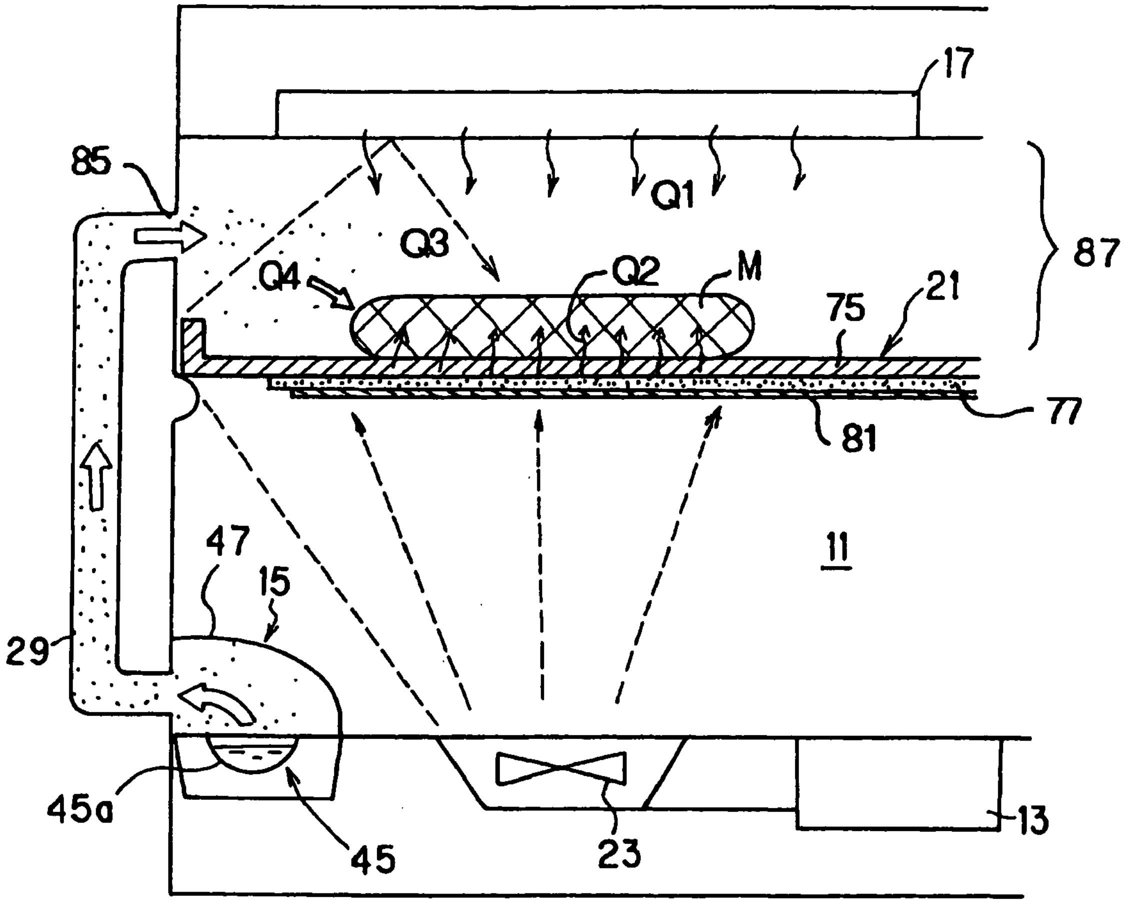
FIG. 10 is an explanatory view conceptually showing an example of a state in which a thing to be heated which is mounted on the pan is heated by the supply of a high frequency and steam into the heating chamber.

FIG. 10 conceptually shows an example of such a state that the thing to be heated which is mounted on the pan is heated with the supply of a high frequency and steam into the heating chamber.

This example will be described. First of all, the pan 21 is attached into the upper position of the heating chamber 11 and the thing M to be heated is mounted on the pan 21. The upper heater 17 is caused to generate heat so that the thing M to be heated which is mounted on the pan 21 is heated by radiant heat Q1.

On the other hand, a high frequency is generated from the high frequency generating portion 13 and is diffused and supplied into the heating chamber 11 by the rotation of the stirrer blade 23. Consequently, the high frequency absorbing film 81 of the pan 21 generates heat so that the high frequency heating member 77 is heated and heat Q2 is propagated to the thing M to be heated through the metal plate 75. Moreover, a part Q3 of the high frequency thus generated passes through a gap between the internal wall surface of the heating chamber 11 and the pan 21 and enters the upper space of the pan 21, thereby carrying out high frequency heating over the thing M to be heated. Depending on a heating object, the high frequency heating is not positively carried out over the thing M to be heated. The heat quantity of Q3 is set to be small. More specifically, the temperature of the thing M to be heated is raised by the heat generation of the high frequency heating member 77, while a high frequency to be used for the heating operation of the high frequency heating member 77 is shielded by the metal plate 75 of the pan 21 so as not to be supplied to the thing M to be heated. In addition to the supply of the high frequency from the bottom face of the heating chamber 11, also in the case in which a power supply port is provided on the side surface of the heating chamber 11 under the pan 21, a high frequency can be shielded in the same manner.

Furthermore, the steam sent from the steam generating portion 15 is supplied from a steam blow-off port 85 to an upper space 87 of the heating chamber 11 through the steam pipe 29. Steam Q4 hits upon the thing M to be heated so that a heat exchange is carried out. Consequently, the thing M to be heated is heated.

By the radiant heat Q1, the heat Q2 generated from the high frequency heating member 77, apart Q3 of the high frequency and the steam Q4, the thing M to be heated is heated efficiently. By combining the heat sources Q1 to Q4 properly and selectively to sequentially carry out the heating, moreover, it is possible to perform an optimum heating process to meet the heating purpose of the thing M to be heated. By the effect of shielding the high frequency through the metal plate 75 of the pan 21, furthermore, excessive heating can be prevented from being caused by the high frequency during the steam cooking of the thing M to be heated. Thus, genuine steam cooking can be carried out.

By causing the convection heater of the indoor air heating portion (not shown) to generate heat, furthermore, the thing M to be heated can also be heated uniformly at a high temperature.

By reducing the volume of the heating chamber 11 contributing to the cooking by a division through the pan 21, thus, the steam can be filled quickly. Moreover, an inner temperature in the upper space of the heating chamber 11 is also raised suddenly up to a temperature (for example, 100° C.) which is close to a steam temperature by the supply of the steam. In an early stage after the start of the heating operation of the high frequency heating apparatus 100, accordingly, the inner part of the heating chamber 11 can be brought into a state in which the steam cooking can be carried out. Thus, a time required for the cooking can be shortened considerably. By raising the temperature of the heating chamber 11 by means of the upper heater 17 in the generation of the steam, furthermore, the dew condensation of the heating chamber 11 can be prevented. By changing the height of the pan 21 in the heating chamber 11, moreover, a substantial steam temperature can be regulated and the heating force of the steam can easily be varied without controlling the temperature.

Depending on a temperature detected by the thermistor 65 of the heating block 45 or the temperature sensor 31 for detecting a temperature in the heating chamber 11, moreover, the control portion 39 feedback controls the amount of generation of the steam or the amount of heating of the heater, thereby properly setting the temperature and the amount of the steam in the heating chamber 11. Thus, it is possible to easily carry out egg cooking which is hard to control a temperature.

The steam sent from the steam generating portion 15 is supplied to the upper space of the heating chamber 11 through the steam pipe 29 provided on the outside of the heating chamber 11. Therefore, it is possible to obtain a structure in which the contamination of a cooked thing does not stick to the piping member such as the steam pipe 29 and cleaning can easily be carried out.

In the high frequency heating apparatus 100 according to the embodiment, furthermore, the two steam generating portions 15 are provided in the corner portions on the bottom face of the heating chamber 11. Therefore, the amount of the steam to be generated can be varied depending on the heating contents of the thing to be heated, and a thing requiring a large amount of steam and a thing requiring a small amount of steam can be divided, and a steam supply pattern can be optionally set to have the amount of supply of the steam which is desired.

By taking an example of the heating process using the high frequency heating apparatus 100, detailed description will be sequentially given to the remarkable advantages of the invention which are produced by the respective heating processes.

Figure 11:
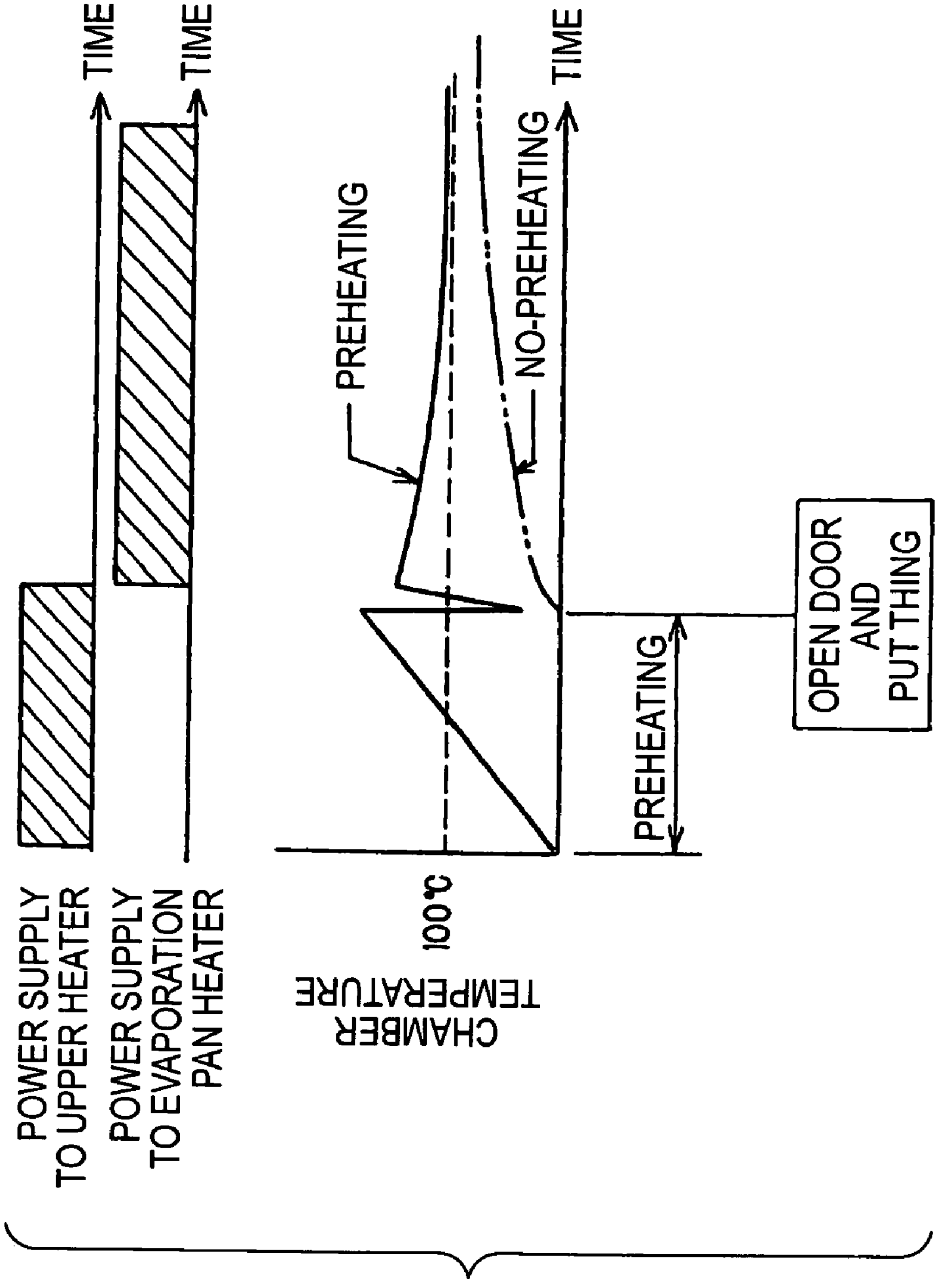
FIG. 11 is an explanatory diagram showing an example of the heating pattern of steam cooking.

FIG. 11 shows an example of the heating pattern of the steam cooking. In the heating pattern, the pan 21 is put in the heating chamber 11 in the early stage of the heating and a power is supplied to the upper heater 17 for a predetermined time, thereby carrying out preheating. After the preheating is completed, the supply of the power to the upper heater 17 is stopped and the power is supplied to the sheath heater 53 to be the evaporation pan heater. Consequently, the steam is supplied into the heating chamber 11.

Referring to a change in the inner temperature in the heating pattern, the inner temperature is once dropped when the openable door is opened to mount the thing to be heated on the pan after the preheating, and the inner temperature is suddenly raised when the openable door is closed. Thus, a steady state is quickly brought in the vicinity of 100° C. to be a steam supply temperature. In most cases, the dew condensation is caused by the generated steam over the surface of the thing to be heated, and heat is rarely taken away into the wall surface of the heating chamber 11. Furthermore, it is possible to easily remove the condensed water stored in the pan 21 by detaching the pan 21.

On the other hand, in the case in which the power is supplied to the evaporation pan heater without carrying out the preheating, the inner temperature is raised slowly, causing an increase in a time required for the cooking. Since the inner temperature is low, moreover, the generated steam is condensed in a large amount over each surface of the heating chamber 11 so that the condensed water is stored on the bottom face of the heating chamber 11. In this case, a great deal of time and labor is required for removing the condensed water from the bottom face or side surface of the heating chamber 11.

In the case in which a green vegetable is further heated as the thing to be heated, for example, the green color of the green vegetable does not become brilliant when the preheating is not carried out, and an atmospheric temperature in the heating chamber 11 reaches 100° C. or more when the preheating is carried out. Also in a steam environment having a high concentration, consequently, the steam heating can be carried out efficiently in a short time. Thus, the green vegetable can be finished brilliantly.

Figure 12:
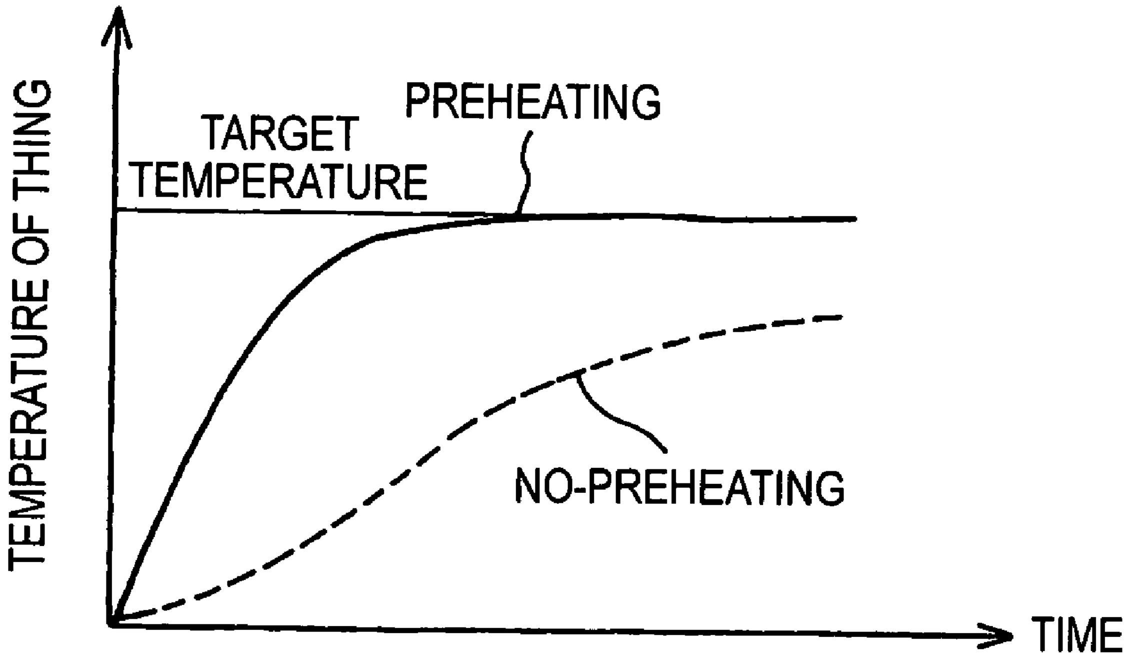
FIG. 12 is a graph showing a temporal change in the temperature of the thing to be heated which is obtained depending on the presence of preheating.

FIG. 12 is a graph showing a temporal change in the temperature of the thing to be heated depending on the presence of the preheating. In the case in which the preheating is carried out as described above, the temperature rising speed of the thing to be heated is high and a target temperature is quickly reached to bring a steady state. On the other hand, in the case in which the preheating is not carried out, the temperature of the thing to be heated is raised slowly and a longer time is required for reaching the target temperature as compared with the case in which the preheating is carried out.

Figure 13:
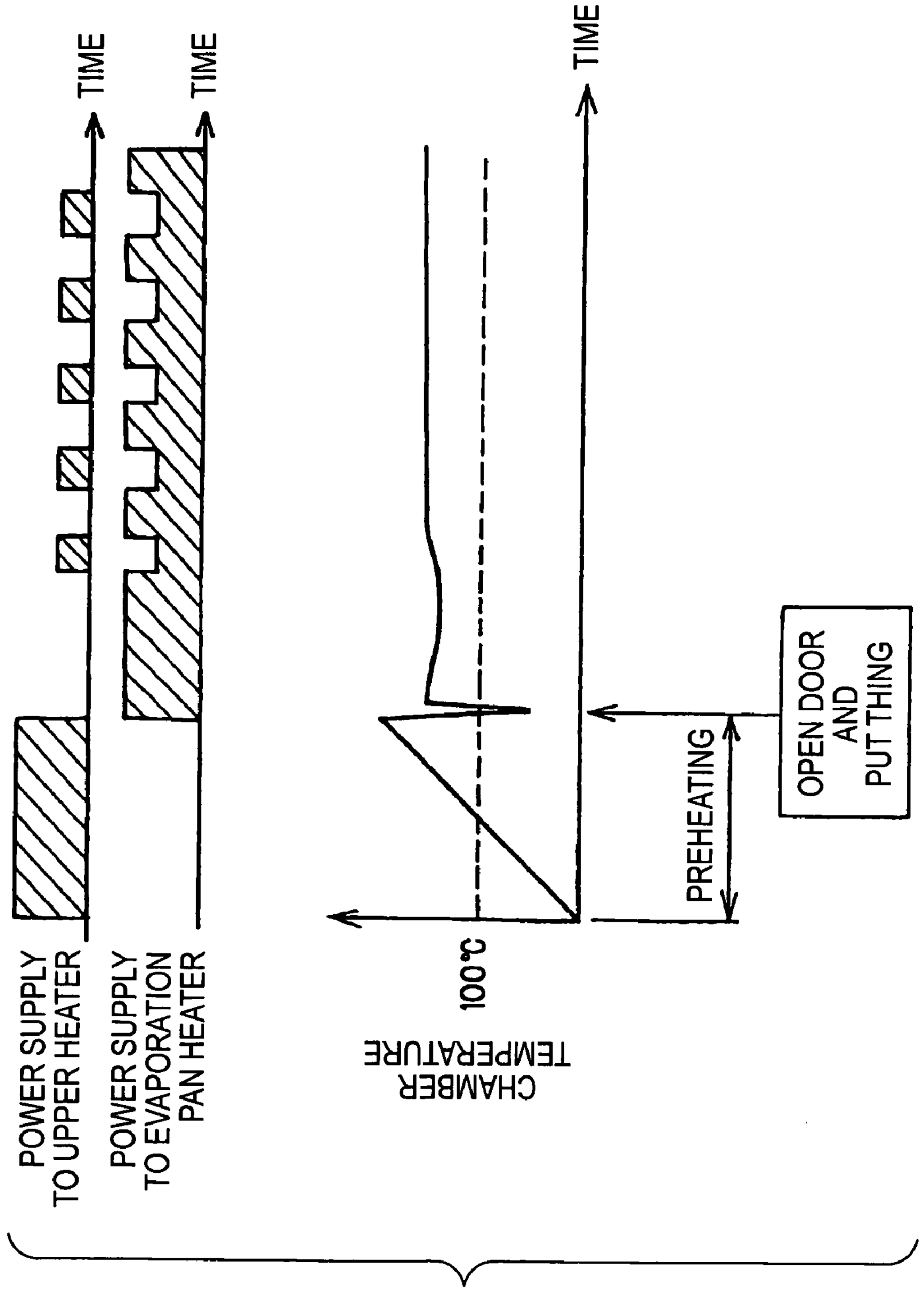
FIG. 13 is an explanatory diagram showing a heating pattern in the case in which an atmospheric temperature in the heating chamber is to be raised, FIGS. 14(*a*) and 14(*b*) are explanatory charts showing an example of the heating pattern of grill cooking, FIG. 14(*a*) being a graph showing a change in a temperature according to an example in which steam is not supplied and FIG. 14(*b*) being a graph showing a change in a temperature according to an example in which the steam is supplied.

In the case in which the atmospheric temperature in the heating chamber 11 is to be raised, furthermore, it is desirable that the supply of a power to the upper heater and the evaporation pan heater should be carried out alternately as shown in FIG. 13. If the sum of the power required for the upper heater and the power required for the evaporation pan heater is set to be a maximum within such a range as not to exceed the allowable power value of the high frequency heating apparatus 100, preferably, the heating effect can be maximized. Such a heating pattern can be suitably applied to heat a root vegetable, for example. In this case, moreover, the temperature in the heating chamber 11 is raised comparatively quickly even if the preheating is not carried out. However, it is preferable that the preheating should be carried out in order to shorten a time required for the cooking.

Next, an example of grill cooking will be described.

Figure 14:
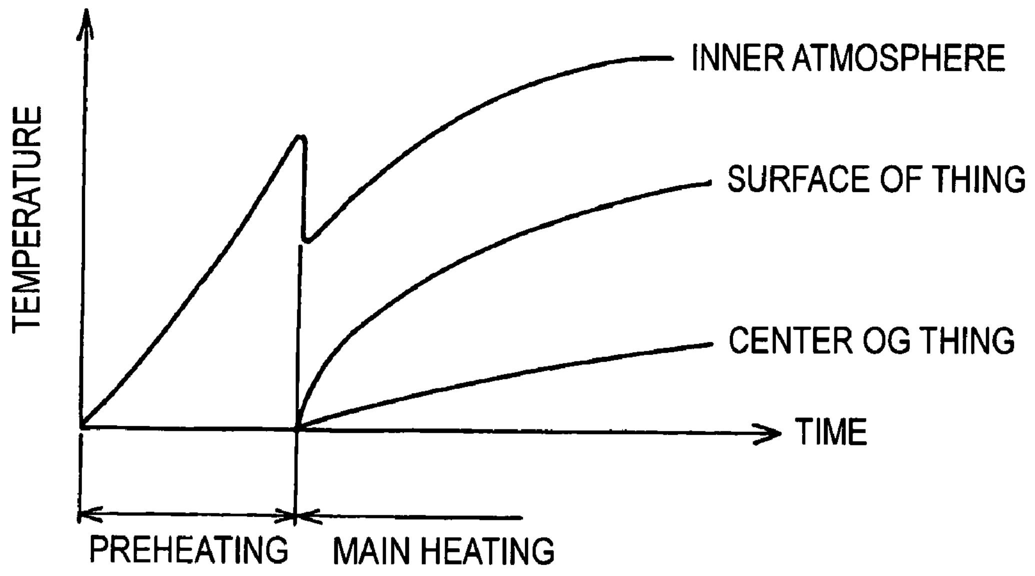
Figure 14:
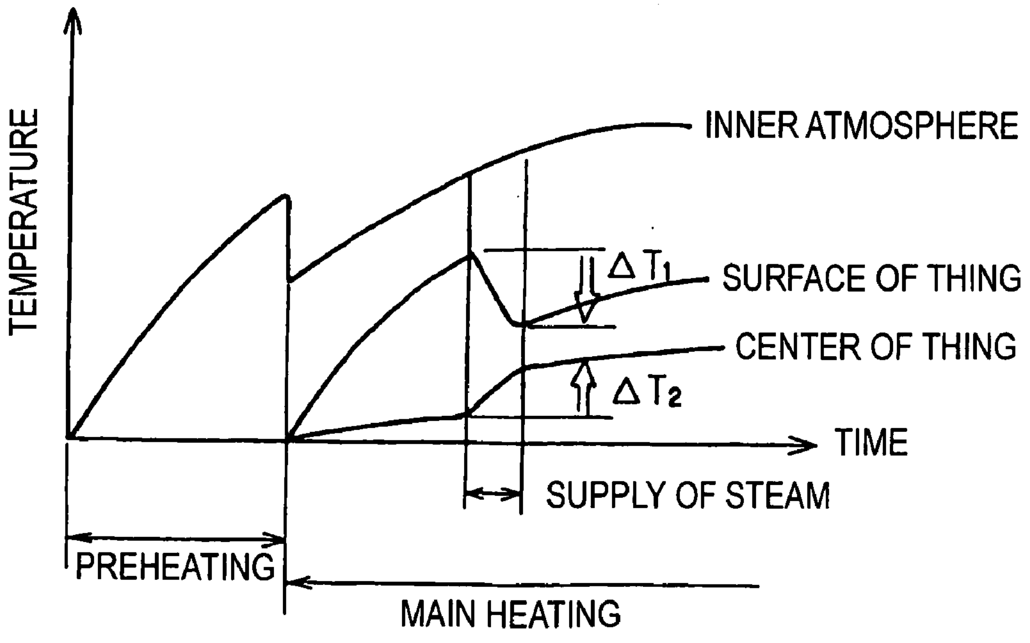

FIG. 14 shows an example of a heating pattern for the grill cooking. In the grill cooking, the thing M to be heated is mounted on the pan 21 and heating is carried out to brown the thing M to be heated by the heat generation of the upper heater 17. In this case, as shown in FIG. 14(*a*), the temperature of the thing M to be heated is raised quickly by heating over the surface of an upper part after the preheating is carried out and the main heating is then started, while a temperature rising speed obtained by the heating is low in the inner part of the thing M to be heated and a difference in a temperature between the surface and the inner part tends to be increased in the early stage of the heating. More specifically, although the temperature is suddenly raised by the heating over the surface of the upper part of the thing M to be heated which is close to the upper heater 17, a long time is required for transferring the heat from the surface to the inner part by the heat capacity of the thing M to be heated so that a temperature rising rate in the inner part of the thing M to be heated is decreased.

As shown in FIG. 14(*b*), therefore, steam is supplied into the heating chamber 11 in the middle of the main heating so that the steam is condensed over the surface of the thing M to be heated which has a lower temperature than the temperature of the supplied steam, and the condensed water evaporates to take away vaporization heat and the temperature of the surface of the thing M to be heated can be dropped temporarily ($\Delta T_1$). On the other hand, in the thing M to be heated, steam having a heat capacity which is approximately a double of the heat capacity of air in the heating chamber 11 and having a higher temperature than the temperature of the thing M to be heated is caused to hit upon the thing M to be heated. Consequently, the heat capacity of the steam is efficiently transferred into the thing M to be heated so that a rise in the temperature of the thing M to be heated can be accelerated ($\Delta T_2$). Thus, it is possible to reduce a difference in a temperature between the surface and the inner part of the thing M to be heated. By supplying steam having a lower temperature than the temperature of the heating chamber 11 into the heating chamber 11, moreover, the temperature of a surface layer coming in contact with the air of the thing M to be heated is dropped to prevent the surface from being browned excessively. Consequently, it is possible to eliminate the shortage of the heating in the inner part.

Figure 15:
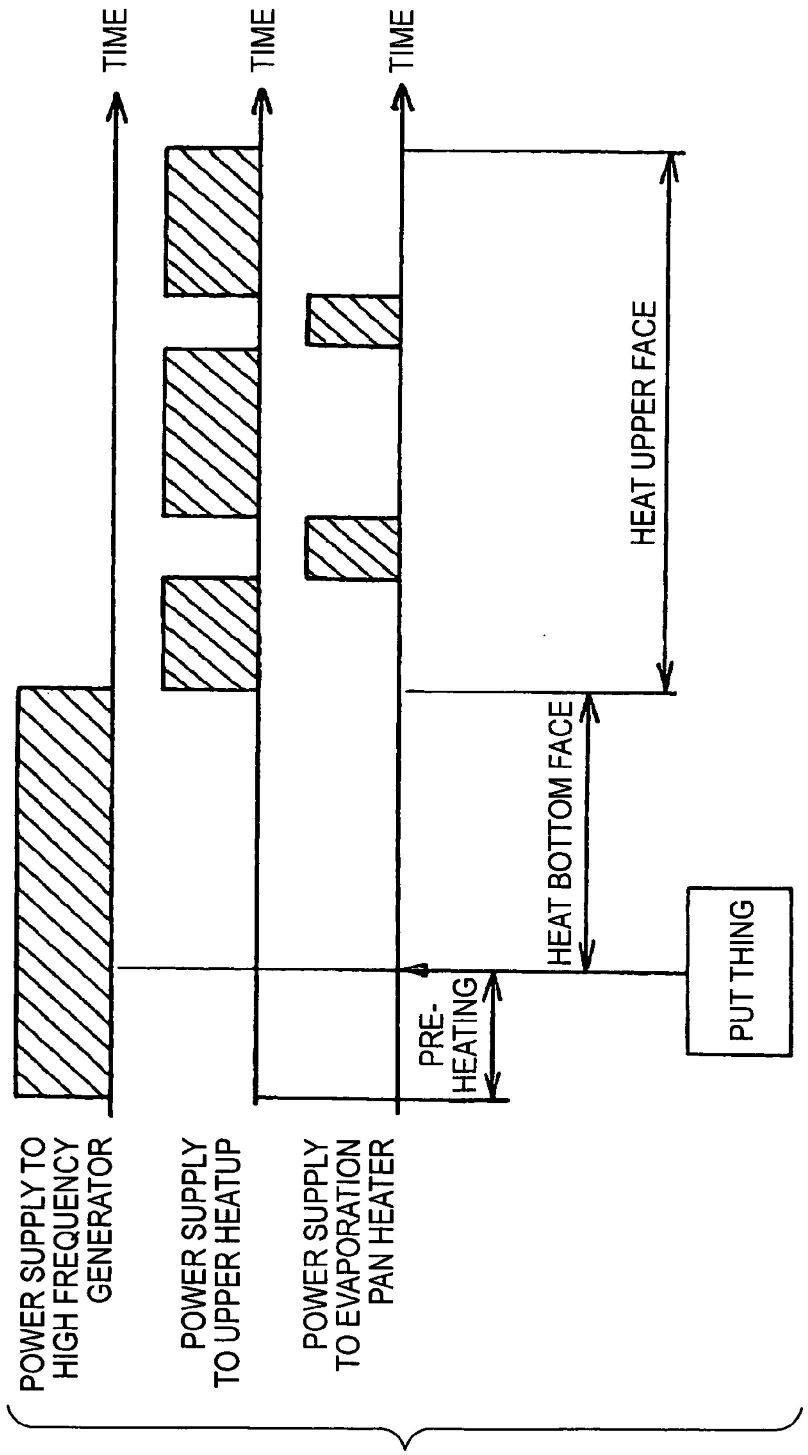
FIG. 15 is an explanatory diagram showing an example of a heating pattern for carrying out grill heating by using high frequency heating together, FIGS. 16(*a*) and 16(*b*) are view showing another example of a structure for the heating method of the steam generating portion, FIG. 16(*a*) being a sectional view showing an example in which a heating block and an evaporation pan are formed separately and FIG. 16(*b*) being a sectional view showing an example in which the evaporation pan is heated by radiant heat, FIGS. 17(*a*) and 17(*b*) are schematic views showing a structure according to an example in which the direction of supply of steam is changed when the steam is to be supplied from the steam generating portion into the heating chamber, FIG. 17(*a*) being a side view and FIG. 17(*b*) being a plan view.

In addition to the heating pattern of the grill cooking, the heating can also be carried out by using high frequency heating together. FIG. 15 shows an example of a heating pattern for carrying out the grill heating using the high frequency heating together.

In this case, in the grill cooking, the high frequency heating member 77 is provided as the pan (see FIG. 9) and the pan 21 is heated by a high frequency wave, which is set to be preheating. In the main heating to be carried out after the preheating, a power is supplied to only the high frequency generating portion to heat the heating pan, thereby heating the bottom face side of the thing M to be heated. Next, the supply of the power to the high frequency generating portion is stopped and the supply of the power to the upper heater 17 is started to heat the upper surface of the thing M to be heated. Then, the power is supplied to the evaporation pan heater of the steam generating portion for a predetermined time in the middle of the heating operation of the upper heater 17, thereby feeding steam to the heating chamber 11. When the power is to be supplied to the evaporation pan heater, the supply of the power to the upper heater 17 is stopped in such a manner that the sum of the power does not exceed the allowable power value of the high frequency heating apparatus 100. Moreover, the supply of the steam may be carried out repetitively plural times and continuously after a predetermined time passes since the start of the main heating.

Referring to the supply of the steam during the heating, it is possible to produce such advantages that moisture is given to the thing M to be heated so as to be soft by the supply in the first half of the cooking, and the inner part of the thing M to be heated is heated well to make browning uniformly by the supply in the second half of the cooking. Even if the surface of the thing M to be heated has concavo-convex portions, the steam enters the concavo-convex portions to prevent a local browning unevenness from being caused over the thing M to be heated, thereby making a browning condition uniform. In the case in which the heating is carried out by the upper heater 17, the amount of the heating is reduced in a portion hidden behind the concavo-convex portions and such an unevenness is caused with difficulty by using the steam heating together. Furthermore, it is possible to prevent such a state that the thing M to be heated which is positioned on the center of the heating chamber 11 is excessively heated and burned and the thing M to be heated which is positioned in the corner portions of the heating chamber 11 is finished in an insufficient heating condition due to a heating unevenness of the upper heater 17 over the heating chamber 11, that is, a heating unevenness in which the amount of heating is increased in the center of the heating chamber 11 and is decreased in the corner portions of the heating chamber 11.

Moreover, such a heating pattern is used for cooking an unboned meat, for example. Consequently, a portion provided around a bone can be heated well, and a surface can be prevented from being burned and an inner part can be heated sufficiently. Thus, a full and soft eating feeling can be obtained.

It is also possible to employ such a structure that each of the heating patterns described above is prestored as a cooking program in the storing portion 95 connected to the control portion 39 shown in FIG. 3 and is optionally selected and executed by the operation of the automatic cooking switch 97 of the operation panel 91. Also in that case, the temperature of the thing to be heated in the heating chamber 11 is detected by the heating temperature sensor 31 to set the control timing of each portion corresponding to the temperature of the thing to be heated and by the measurement of a passing time such as a heating time by means of a timer 99. A timing for generating the steam may be automatically set based on a preset cooking program, and furthermore, a steam supply switch 101 may be provided on the operation panel 91 to start the supply of the steam in an optional timing for pressing down the steam supply switch 101. Consequently, the progress of the cooking for the thing M to be heated is confirmed through the translucent window 41*a* of the openable door 41 and the steam supply switch 101 is pressed down in a desirable timing. Thus, the steam can be supplied in a proper timing and the failure of the cooking can be eliminated reliably, and a convenience can be enhanced.

The heating timings and the amounts of heating of the upper heater, the evaporation pan heater and the high frequency generating portion are varied depending on the type, shape, weight and cooking method of the thing M to be heated and are properly set depending on each of conditions.

Next, description will be given to another example of the structure of the high frequency heating apparatus 100.

Figure 16:
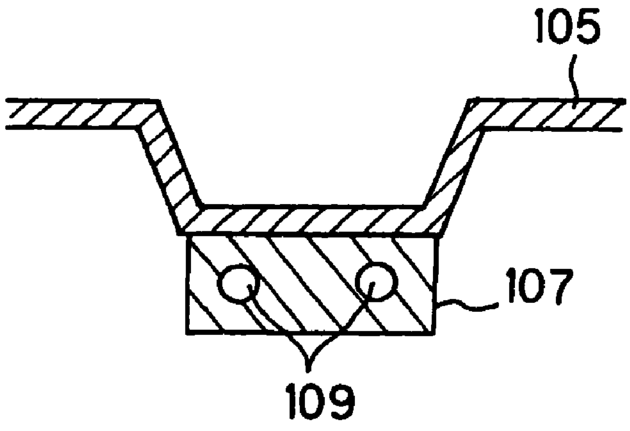
Figure 16:
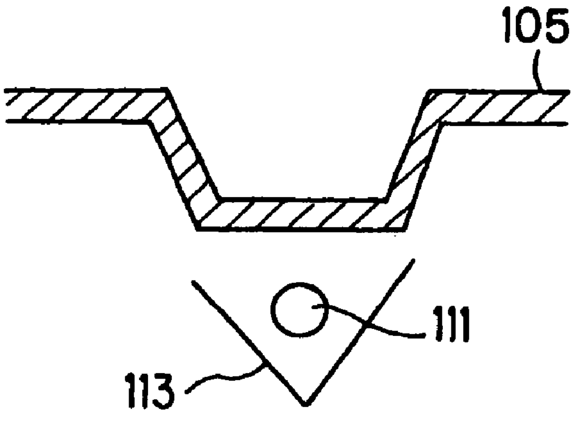

FIG. 16 shows another example of the structure for the heating method of the steam generating portion. (a) shows an example in which a heating block and an evaporation pan are formed separately and (b) shows an example in which the evaporation pan is heated by radiant heat. In the structure shown in FIG. 16(*a*), a heating block 107 is provided in contact with the lower side of an evaporation pan 105 and is thus heated by heating means such as a sheath heater 109, thereby heating the evaporation pan 105. According to this structure, the evaporation pan 105 is connected to the bottom face of the heating chamber 11. Consequently, a pan surface can easily be cleaned.

In the structure shown in FIG. 16(*b*), a pipe heater 111 for carrying out heating by radiant heat is provided under the evaporation pan 105 and a reflecting plate 113 is provided around the pipe heater 111, and the heat generation of the pipe heater 111 is reflected directly or by the reflecting plate 113, thereby heating the evaporation pan 105. According to this structure, the evaporation pan can be heated at a much lower cost.

Figure 17:
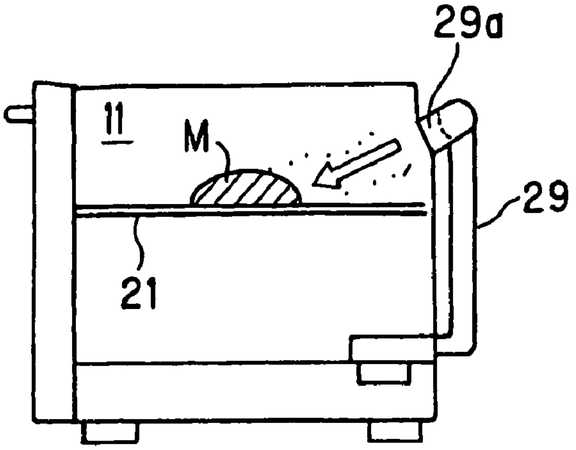
Figure 17:
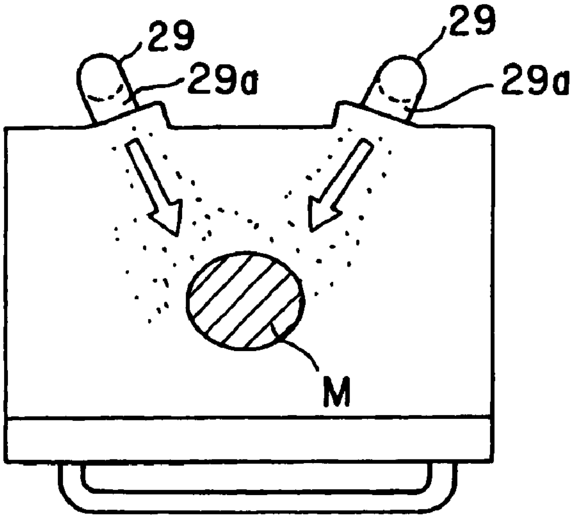

FIG. 17 is a schematic view showing a structure according to an example in which the direction of supply of steam is changed when the steam is supplied from the steam generating portion into the heating chamber, (a) being a side view and (b) being a plan view.

As shown in FIG. 17(*a*), the steam generated in the steam generating portion 15 is supplied through the steam pipe 29 toward the thing M to be heated in the heating chamber 11. In other words, the attachment angle of a termination side 29*a* of the steam pipe 29 to the heating chamber 11 side is set to supply the steam obliquely from above with respect to the mounting surface of the pan 21 which is parallel with the bottom face of the heating chamber 11. In the case in which two steam pipes 29 are provided as shown in FIG. 17(*b*), furthermore, the termination sides 29*a* of the steam pipes 29 are provided toward the center of the heating chamber 11 in order to supply the steam toward the thing M to be heated in the heating chamber 11, respectively. In both cases, it is assumed that the thing M to be heated is mounted in almost the central portion of the pan 21.

According to this structure, the steam is supplied toward the thing M to be heated. Therefore, the amount of heat of the steam is intensively applied to the thing M to be heated so that the thing M to be heated can be heated more quickly. Thus, moisture can be reliably supplied, by the steam, to the thing M to be heated. Moreover, the heat transfer of the steam to the wall surface of the heating chamber 11 is decreased. Consequently, a heating efficiency can be enhanced. Accordingly, the cooking performance of the high frequency heating apparatus can be enhanced and a time required for the cooking can also be shortened. Furthermore, the steam does not directly hit upon the wall surface of the heating chamber. Therefore, the dew condensation of the wall surface can be reduced.

Figure 18:
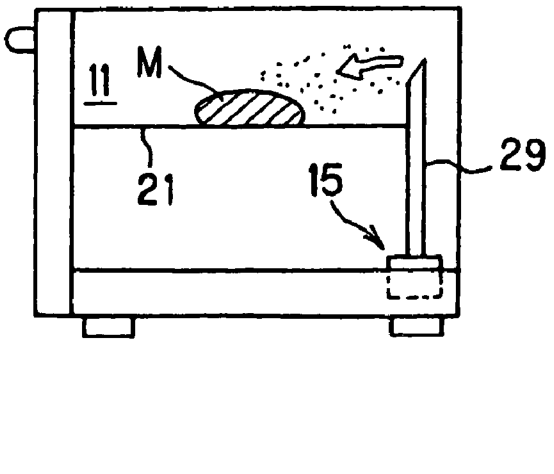
FIG. 18 is a schematic side view showing an example of a structure in which a steam pipe is provided in the heating chamber.

FIG. 18 is a schematic side view showing an example of a structure in which a steam pipe is provided in the heating chamber. In this case, the steam pipe is subjected to surface finishing such as fluorine coating capable of easily removing a scale and a contamination sticking to a cooked thing and an antibacterial treatment for preventing the propagation of various germs. According to this structure, the steam can be guided to the upper space of the heating chamber with a simple structure, and furthermore, the contamination can readily be removed by cleaning. Thus, a convenience can be enhanced.

(Second Embodiment)

Figure 19:
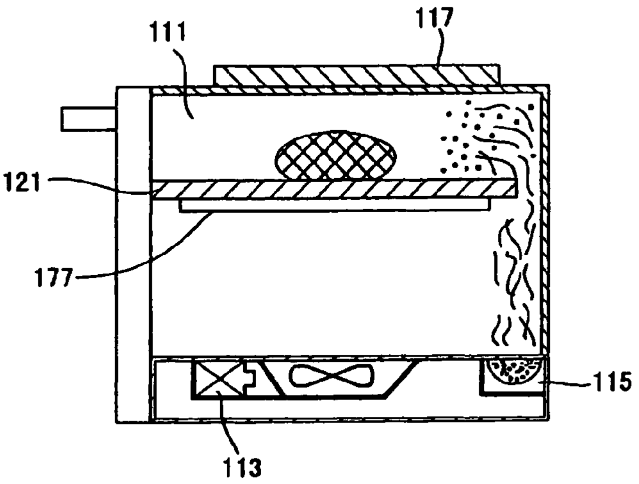
FIG. 19 is a schematic sectional view showing the structure of a high frequency heating device according to a second embodiment of the invention.
Figure 20:
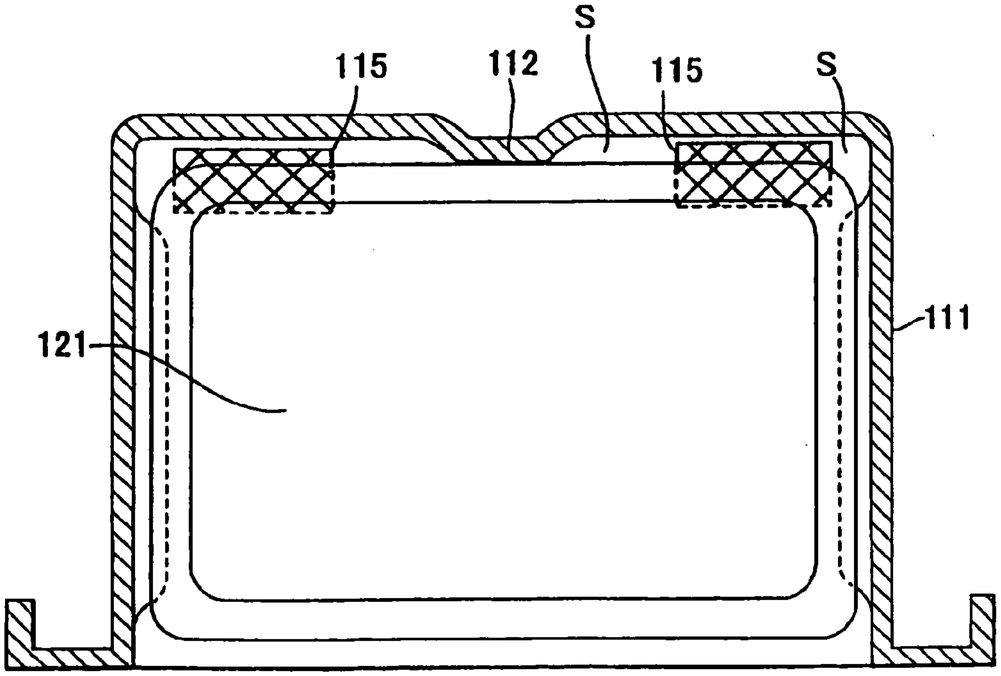
FIG. 20 is a schematic sectional view showing the structure of the high frequency heating device.

FIGS. 19 and 20 are schematic sectional views showing the structure of a high frequency heating device according to a second embodiment of the invention.

As shown in FIGS. 19 and 20, the high frequency heating device comprises a heating chamber 111 for accommodating a thing to be heated, an upper heater 117 to be heating means which is provided in the upper part of the heating chamber 111 and serves to carry out heating by a heater, a high frequency generating portion 113 provided on the bottom face of the heating chamber 111 and serving to generate a high frequency, there by performing high frequency heating, a steam generating portion 115 provided in the inner part of the bottom face of the heating chamber 111, that is, along the wall surface of a back face, and a partition plate 121 to be a pan which is provided with a high frequency heating member 177 on a back face and serves to mount a thing to be heated thereon. A microwave emitted from the high frequency generating portion 113 is supplied into the heating chamber 111 from below. The pan 121 is mounted on a rail (not shown) provided on the side surface of the heating chamber 111 and is thus used.

As shown in FIG. 20, the steam generating portion 115 is provided on the bottom face of the heating chamber 111 along the wall surface of the back face. The internal wall of the heating chamber 111 is provided with a protruded portion 112 on the center of a back face and forms a gap S together with the partition plate 121. Steam generated from the steam generating portion 115 goes up through the gap S between the internal wall of the heating chamber 111 and the partition plate 121 as shown in FIG. 19 so that the steam having a high concentration is stored between the partition plate 121 and the upper heater 117. The steam having a high concentration wraps a thing to be heated which is put on the partition plate 121, and the high frequency heating member 177 is provided on the back face of the partition plate 121 during high frequency heating and is uniformly heated by a microwave supplied evenly from below. Thus, the thing to be heated is browned uniformly. Moreover, the steam stored in a high concentration carries out wrapping heating by heat at 100° C. so that the thing to be heated can be heated uniformly, and at the same time, moisture can be maintained evenly so that a reduction in water can be minimized. Moreover, the steam is brought into an overheating state by the heat of the heater during the heating operation of the heater so that wrapping heating can be implemented further uniformly. At the same time, a portion provided around the thing to be heated is sufficiently filled with the steam to bring an anaerobic state, thereby suppressing the oxidation of oil and removing a salt edge. Thus, a mild taste can be obtained.

In the case in which the partition plate 121 formed by ceramic which includes, on a back face, the high frequency heating member (high frequency absorbing unit) 177 formed of nitride or boride is used as the partition plate 121 and a salted mackerel is used as the thing to be heated, heating is carried out by a microwave and steam and is then performed by the upper heater 117 provided in the upper part of the heating chamber 111 and the steam so that the inner part of the salted mackerel is heated by a microwave and both a surface and a back face are browned, and a water decrease rate can be reduced at a maximum by the wrapping heating of the steam. By bringing the steam into an overheating state, it is possible to remove a sharp salty taste. Consequently, a mild salty taste can be obtained.

For the arrangement and structure of the partition plate 121, the external shape of the partition plate 121 is constituted in such a manner that a gap between the side wall surface of the heating chamber 111 and a door for blocking the heating chamber 111 is reduced in order to divide the heating chamber 111 into upper and lower portions. Consequently, the steam having a high concentration can be supplied to the thing to be heated. Moreover, the microwave supplied from below rarely enters the upper part of the partition plate 121 so that the amount of the microwave supplied to the high frequency heating member is increased. Thus, it is possible to produce such an advantage that the lower surface of the thing to be heated can be browned more easily.

For heating means, hot air may be used in addition to a pipe heater to be the upper heater 117 and a sheath heater. For the partition plate 121, a pan itself may be formed by ceramic to generate heat at a high frequency in addition to the partition plate 121 having the high frequency heating member 177 provided on a back face and serving to mount the thing to be heated thereon.

In the heating device, a bottom face may be provided with a stirrer blade as high frequency distributing means. Such a heating device is provided on the bottom face of the heating chamber and serves to generate a high frequency wave, thereby carrying out high frequency heating. The stirrer blade is effective as the high frequency distributing means for distributing and supplying a high frequency into the heating chamber 111 in order to uniformly irradiate a microwave emitted from the high frequency generating portion 113 onto the thing to be heated. By this structure, the microwave is supplied into the heating chamber 111 from below more uniformly. Thus, the thing to be heated can be heated more uniformly.

If the partition plate 121 is formed of a metal capable of shielding a high frequency in place of the ceramic material, moreover, the microwave supplied from below enters the upper part more rarely so that the water decrease rate of the thing to be heated can be reduced at a maximum, and at the same time, a wrapping grill cooking effect can be enhanced by the steam. Thus, it is possible to produce such an advantage that cooking can be carried out with the taste of the thing to be heated maintained.

Thus, the partition plate provided with the high frequency heating member can be uniformly heated by the microwave supplied uniformly from below, and at the same time, uniform wrapping cooking can be carried out by the steam and the heater.

Figure 21:
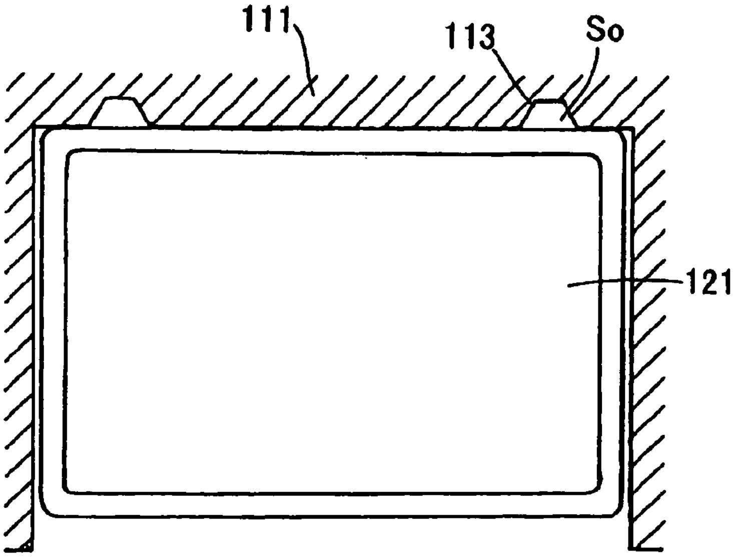
FIG. 21 is an enlarged sectional view showing a main part according to a variant of the high frequency heating device in accordance with the second embodiment of the invention.

In the second embodiment, one protruded portion 112 is formed on the back face side of the internal wall of the heating chamber 111 to form the gap S. As a variant, the concave portion 113 may be formed at both sides on the back face of the internal wall of the heating chamber 111 to form two gaps S0 between the partition plate 121 and the internal wall of the heating chamber 111, thereby guiding steam from the two places to an upper space as shown in FIG. 21.

Figure 22:
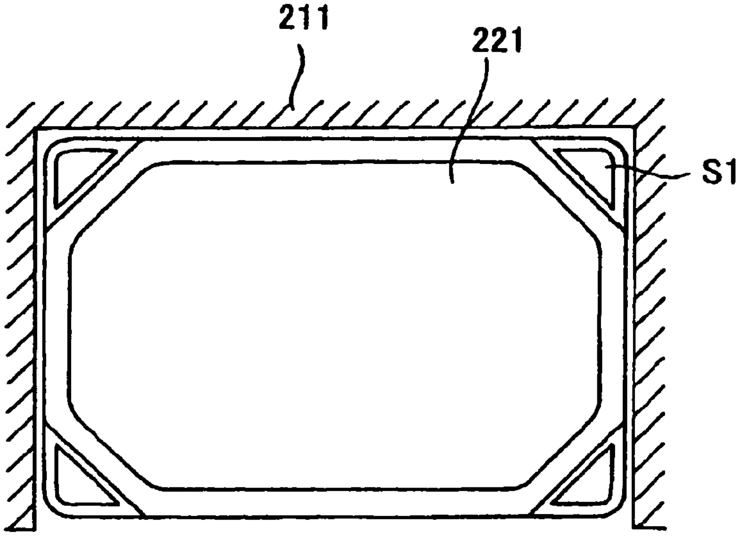
FIG. 22 is an enlarged sectional view showing a main part according to a variant of the high frequency heating device in accordance with the second embodiment of the invention.

As shown in FIG. 22, moreover, a through hole S1 may be formed in four corners of a partition plate itself in place of the internal wall side of a heating chamber 211. By this structure, similarly, steam generated in a steam generating portion passes through the through hole S1 and is thus guided to an upper space. An air supply port may be provided in a lower space to supply outside air. Consequently, the outside air comes in contact with the steam well in the lower space to drop a steam temperature, and is supplied to the upper space via the through hole S1. At this time, the steam temperature can be regulated according to the amount of flow of the outside air. Consequently, the steam temperature can be regulated and it is also possible to implement heating with steam at a low temperature of 85° C. or less which is effective for an egg dish.

Figure 23:
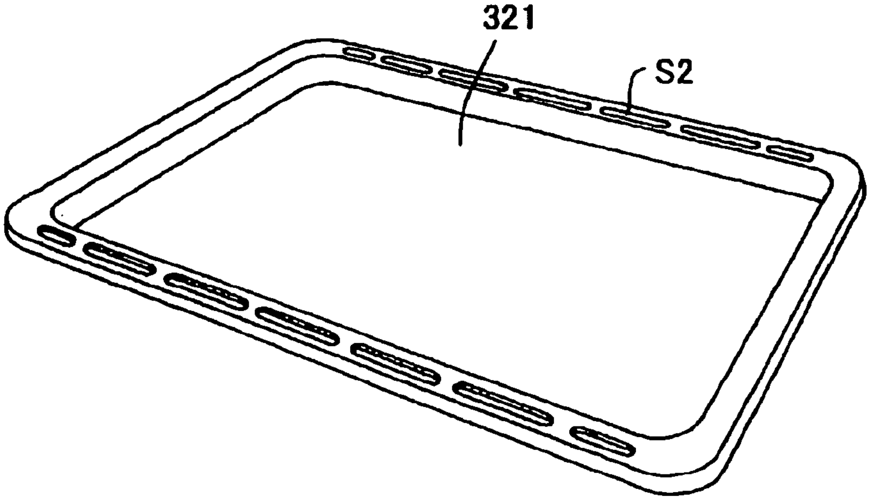
FIG. 23 is an enlarged sectional view showing a main part according to a variant of the high frequency heating device in accordance with the second embodiment of the invention.
Figure 24:
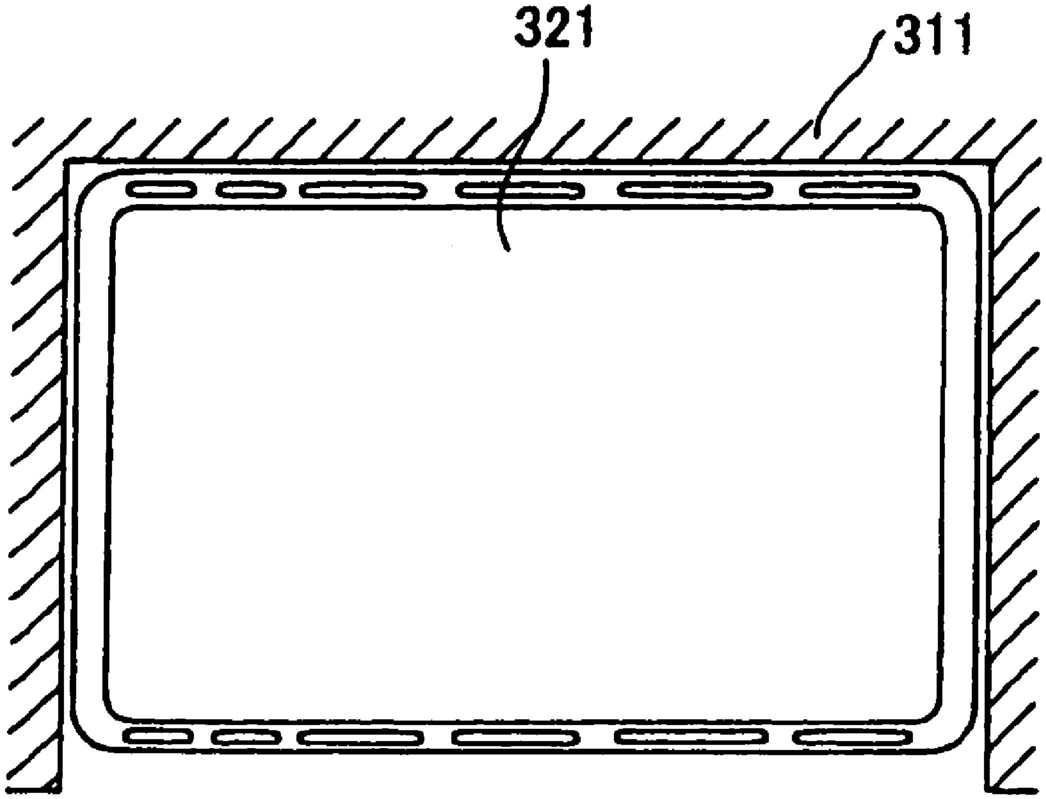
FIG. 24 is an enlarged sectional view showing a main part according to a variant of the high frequency heating device in accordance with the second embodiment of the invention.

As shown in FIGS. 23 and 24, furthermore, a large number of through holes S2 may be arranged along the peripheral edge of a partition plate 321. In this case, the steam is supplied to the upper space in a position which is placed slightly apart from the internal wall of a heating chamber 311. Therefore, it is possible to prevent a dew condensation over the internal wall of the heating chamber 311.

INDUSTRIAL APPLICABILITY

According to the high frequency heating apparatus in accordance with the invention, there is provided a partition plate which mounts a thing to be heated thereon and is disposed to be upward removable apart from the bottom face of a heating chamber at a predetermined interval, thereby dividing a space in the heating chamber. Thus, steam generated in a steam generating portion can be efficiently supplied into an upper space positioned above the partition plate. Consequently, it is possible to provide a high frequency heating device which is effective for steam cooking and is easy to handle. Thus, the high frequency heating device can variously be applied to the steam cooking. Moreover, a dew condensation can be prevented. Therefore, the high frequency heating device is effective for being easy to handle and producing excellent finishing with maintenance free.

What is claimed is:

1. A high frequency heating apparatus for heating a thing to be heated comprising:

a high frequency generating portion;

a heating chamber for accommodating the thing to be heated;

a steam generating portion for generating steam in the heating chamber located in the lower back portion of the heating chamber;

a partition plate which serves to mount the thing to be heated thereon and is provided to be upward removable apart from a bottom face of the heating chamber at a predetermined interval, thereby dividing a space in the heating chamber;

a steam pipe; and a steam duct located within the heating chamber for introducing generated steam into the steam pipe, wherein at least one of a high frequency and steam generating portion is supplied to the heating chamber, wherein the steam is supplied into an upper space positioned above the partition plate.

2. The high frequency heating apparatus according to claim 1, wherein a gap is provided between a peripheral edge of the partition plate and a side wall of the heating chamber, and the steam generated in the steam generating portion passes through a side wall of the heating chamber and is guided to the upper space of the heating chamber through the gap.

3. The high frequency heating apparatus according to claim 2, wherein the partition plate has a through hole on a peripheral part, and the steam generated in the steam generating portion is guided to the upper space of the heating chamber via the through hole.

4. The high frequency heating apparatus according to claim 1, wherein the partition plate includes a high frequency heating member.

5. The high frequency heating apparatus according to claim 1, wherein the partition plate includes a high frequency shielding unit.

6. The high frequency heating apparatus according to claim 5, wherein the high frequency shielding unit includes a metal plate.

7. The high frequency heating apparatus according to claim 1, further comprising preheating means for raising an atmospheric temperature in the heating chamber.

8. The high frequency heating apparatus according to claim 7, wherein the preheating means includes an upper heater provided in an upper part of the heating chamber.

9. The high frequency heating apparatus according to claim 7, wherein the preheating means includes a high frequency heating member provided on the partition plate.

10. The high frequency heating apparatus according to claim 7, further comprising a control portion for controlling the high frequency generating portion, the steam generating portion and the preheating means, the control portion being constituted to execute, in this order, a preheating step of heating the heating chamber by heat generation of the preheating means and a main heating step of supplying at least one of a high frequency generated from the high frequency generating portion and steam supplied from the steam generating portion to carry out a heating process over the thing to be heated.

11. The high frequency heating apparatus according to claim 7, further comprising a control portion for controlling the high frequency generating portion, the steam generating portion and the preheating means, the control portion having an interrupt processing function for supplying steam from the steam generating portion into the heating chamber for a predetermined time while the thing to be heated is heated.

12. The high frequency heating apparatus according to claim 11, further comprising a steam supply switch for executing the interrupt processing in an optional timing.

13. The high frequency heating apparatus according to claim 1, wherein the partition plate is engaged with an engaging portion provided in a plurality of height positions on an internal wall surface of the heating chamber.

14. The high frequency heating apparatus according to claim 1, wherein the steam generating portion is provided along a wall surface on a back side of a bottom face of the heating chamber.

15. The high frequency heating apparatus according to claim 1, wherein the steam generating portion is constituted in such a manner that the steam directly hits upon the thing to be heated.

16. The high frequency heating apparatus according to claim 1, further comprising high frequency distributing means for distributing and supplying a high frequency into the heating chamber.

17. The high frequency heating apparatus according to claim 1 further comprising an evaporator pan having a detachable cover.

18. The high frequency heating apparatus according to claim 1, wherein the steam generating portion is located only in the lower back portion of the heating chamber.

19. A high frequency heating apparatus for heating a thing to be heated, comprising:

a high frequency generating portion;

a heating chamber for accommodating the thing to be heated;

a steam generation portion for generating steam in the heating chamber; and, a steam delivery means for guiding the generated steam from inside the heating chamber to outside the heating chamber through a steam delivery path back into the heating chamber, wherein the steam delivery means includes a steam pipe and a steam duct, and further wherein the steam duct is located within the heating chamber and introduces the generated steam into the steam pipe.

20. A high frequency heating apparatus for heating a thing to be heated comprising:

a high frequency generating portion;

a heating chamber for accommodating the thing to be heated;

a steam generating portion for generating steam in the heating chamber located in the lower back portion of the heating chamber;

a feed water tank;

a feed water pipe connecting the feed water tank to the steam generating portion where the feed water pipe further comprises an intermediate portion; and, a heater to heat the water in the intermediate portion before the water enters the steam generating portion.

* * * * *